(12) United States Patent
Chikuma et al.

(10) Patent No.: US 11,610,737 B2
(45) Date of Patent: Mar. 21, 2023

(54) MULTILAYER CERAMIC ELECTRONIC COMPONENT

(71) Applicant: Murata Manufacturing Co., Ltd., Nagaokakyo (JP)

(72) Inventors: Shinobu Chikuma, Nagaokakyo (JP); Nobuyuki Koizumi, Nagaokakyo (JP); Akio Masunari, Nagaokakyo (JP); Yukie Watanabe, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 17/169,707

(22) Filed: Feb. 8, 2021

(65) Prior Publication Data

US 2021/0272756 A1 Sep. 2, 2021

(30) Foreign Application Priority Data

Feb. 27, 2020 (JP) .............................. JP2020-031152

(51) Int. Cl.
*H01G 4/30* (2006.01)
*H01G 4/232* (2006.01)
*H01G 4/12* (2006.01)
*H01G 4/248* (2006.01)

(52) U.S. Cl.
CPC ......... *H01G 4/2325* (2013.01); *H01G 4/1209* (2013.01); *H01G 4/248* (2013.01); *H01G 4/30* (2013.01)

(58) Field of Classification Search
None
See application file for complete search history.

(56) References Cited

U.S. PATENT DOCUMENTS

| | | | | |
|---|---|---|---|---|
| 10,249,436 B2* | 4/2019 | Kayatani | ................ | H01G 4/008 |
| 10,361,033 B2* | 7/2019 | Kayatani | ................ | H01G 4/224 |
| 10,361,035 B1* | 7/2019 | Song | .................... | H01G 4/1227 |
| 10,366,834 B1* | 7/2019 | Lee | ......................... | H01G 4/248 |
| 2013/0058006 A1* | 3/2013 | Kim | ....................... | H01G 4/232 |
| | | | | 361/321.2 |
| 2014/0085767 A1* | 3/2014 | Kang | ...................... | H01G 4/12 |
| | | | | 361/301.4 |

(Continued)

FOREIGN PATENT DOCUMENTS

| | | |
|---|---|---|
| JP | 09-180957 A | 7/1997 |
| JP | 2001-044069 A | 2/2001 |

(Continued)

OTHER PUBLICATIONS

Office Action in JP2020-031152, dated Aug. 23, 2022, 4 pages.

*Primary Examiner* — Dion R. Ferguson
(74) *Attorney, Agent, or Firm* — Keating & Bennett, LLP

(57) ABSTRACT

A multilayer ceramic electronic component includes a multilayer body including layered ceramic layers and layered inner electrode layers and having a rectangular parallelepiped shape, and outer electrodes covering both end surfaces of the multilayer body and extending from both end surfaces to cover at least a portion of a first main surface of the multilayer body. The multilayer ceramic capacitor includes an insulating layer continuously extending from a ceramic layer at the first main surface of the multilayer body so as to cover end edge portions of both the outer electrodes located on the first main surface of the multilayer body, and t2>t1 is satisfied.

22 Claims, 13 Drawing Sheets

(56) References Cited

U.S. PATENT DOCUMENTS

| | | | | |
|---|---|---|---|---|
| 2015/0084481 A1* | 3/2015 | Mori | ...... | H01G 4/252 |
| | | | | 29/829 |
| 2015/0124370 A1* | 5/2015 | Ahn | ...... | H01G 4/12 |
| | | | | 361/272 |
| 2015/0325369 A1* | 11/2015 | Inoue | ...... | H01C 17/00 |
| | | | | 336/200 |
| 2017/0352485 A1* | 12/2017 | Kayatani | ...... | H01G 4/232 |
| 2017/0352487 A1* | 12/2017 | Kayatani | ...... | H01G 4/30 |
| 2018/0025844 A1* | 1/2018 | Sato | ...... | H01G 4/008 |
| | | | | 361/321.2 |
| 2018/0068795 A1* | 3/2018 | Park | ...... | H01G 4/2325 |
| 2018/0366248 A1* | 12/2018 | Maruyama | ...... | H01G 4/30 |
| 2019/0131076 A1* | 5/2019 | Fukumura | ...... | H01G 4/232 |
| 2019/0355522 A1* | 11/2019 | Kanbe | ...... | H01G 4/30 |
| 2019/0371527 A1* | 12/2019 | Sugita | ...... | H01G 4/232 |
| 2020/0161051 A1* | 5/2020 | Tanaka | ...... | H01G 4/005 |
| 2020/0365326 A1* | 11/2020 | Masunari | ...... | H01G 4/30 |
| 2021/0272756 A1* | 9/2021 | Chikuma | ...... | H01G 4/232 |

FOREIGN PATENT DOCUMENTS

| | | |
|---|---|---|
| JP | 2012-222124 A | 11/2012 |
| JP | 2014068000 A | 4/2014 |
| JP | 2018133355 A | 8/2018 |
| JP | 2019083291 A | 5/2019 |

* cited by examiner

III-III CROSS SECTIONAL VIEW

V-V CROSS SECTIONAL VIEW

XII-XII CROSS SECTIONAL VIEW

XIV-XIV CROSS SECTIONAL VIEW

XVI-XVI CROSS SECTIONAL VIEW

MULTILAYER CERAMIC ELECTRONIC COMPONENT

CROSS REFERENCE TO RELATED APPLICATIONS

This application claims the benefit of priority to Japanese Patent Application No. 2020-031152 filed on Feb. 27, 2020. The entire contents of this application are hereby incorporated herein by reference.

BACKGROUND OF THE INVENTION

1. Field of the Invention

The present invention relates to a multilayer ceramic electronic component, and particularly, a multilayer ceramic capacitor or the like.

2. Description of the Related Art

A conventional multilayer ceramic capacitor includes outer layer portions on both main surface sides of a multilayer body. Each of the outer layer portions is composed of a ceramic. Outer electrodes are disposed on both end surfaces of the multilayer body so as to cover the outer layer portions. In the case where such a multilayer ceramic capacitor is mounted on a mounting substrate using a solder, a crack may be generated from an end portion of a joined portion between an outer electrode and the solder when the substrate is deflected.

Japanese Patent Laid-Open No. 9-180957 discloses a multilayer ceramic capacitor to address such a crack resulting from deflection. In this multilayer ceramic capacitor, inner electrodes are embedded in layers made of a dielectric ceramic. At both ends of the multilayer ceramic capacitor, terminal electrodes (outer electrodes) each including an underlying electrode, a Ni plating layer, and a Sn-containing plating layer are formed. In this multilayer ceramic capacitor, a portion of an end portion of each terminal electrode in contact with the dielectric ceramic is covered with an electrically insulating layer having low wettability with respect to a solder.

However, when such an electrically insulating layer is formed on a bottom surface portion in the multilayer ceramic capacitor after each terminal electrode is formed, a distance is provided between a conductor surface of the terminal electrode and a solder disposed on an upper surface of a land electrode provided on a surface of a mounting substrate, with the result that a problem such as a tombstone phenomenon is likely to occur during mounting by reflow of a solder, disadvantageously.

SUMMARY OF THE INVENTION

Preferred embodiments of the present invention provide multilayer ceramic electronic components that each have an improved mechanical strength and that are each able to be stably mounted on a mounting substrate.

A multilayer ceramic electronic component according to a preferred embodiment of the present invention includes a multilayer body including a plurality of layered ceramic layers and a plurality of layered inner electrode layers, a first main surface and a second main surface facing each other in a layering direction, a first side surface and a second side surface facing each other in a width direction orthogonal or substantially orthogonal to the layering direction, and a first end surface and a second end surface facing each other in a length direction orthogonal or substantially orthogonal to the layering direction and the width direction; a first outer electrode covering the first end surface and extending from the first end surface so as to cover portions of the first main surface, the second main surface, the first side surface, and the second side surface; a second outer electrode covering the second end surface and extending from the second end surface so as to cover portions of the first main surface, the second main surface, the first side surface, and the second side surface; and an insulating layer, the insulating layer continuously extending from a ceramic layer at the first main surface of the multilayer body so as to cover an end edge portion of the first outer electrode located on the first main surface of the multilayer body and continuously extending from the ceramic layer at the first main surface of the multilayer body so as to cover an end edge portion of the second outer electrode located on the first main surface of the multilayer body, wherein $t2 > t1$ is satisfied, where $t1$ represents a dimension from a surface of the first main surface of the multilayer body to a first-main-surface-side surface of the insulating layer in the layering direction, and $t2$ represents each of a dimension from the surface of the first main surface of the multilayer body to a first-main-surface-side surface of the first outer electrode in the layering direction and a dimension from the surface of the first main surface of the multilayer body to a first-main-surface-side surface of the second outer electrode in the layering direction.

According to preferred embodiments of the present invention, multilayer ceramic electronic components that each have an improved mechanical strength and that are each able to be stably mounted on a mounting substrate are provided.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

1. Multilayer Ceramic Electronic Component

First Preferred Embodiment

A multilayer ceramic capacitor as an exemplary multilayer ceramic electronic component according to a first preferred embodiment of the present invention will be described.

Figure 1:
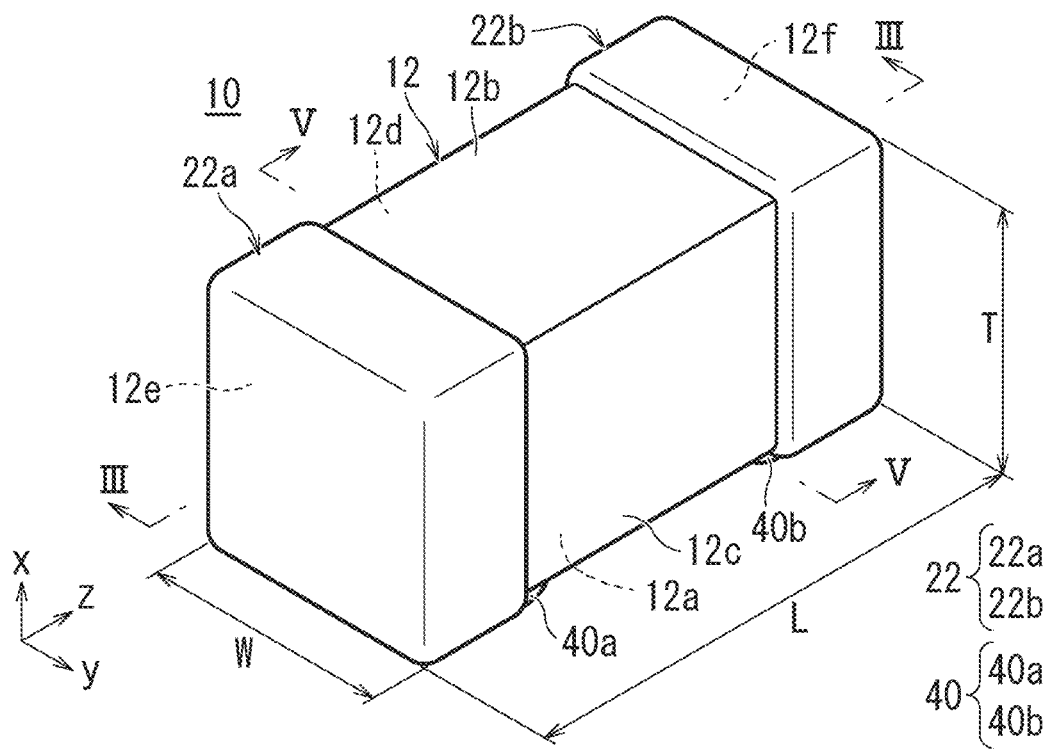
FIG. 1 is an external perspective view showing a multilayer ceramic capacitor as an exemplary multilayer ceramic electronic component according to a first preferred embodiment of the present invention.
Figure 2:
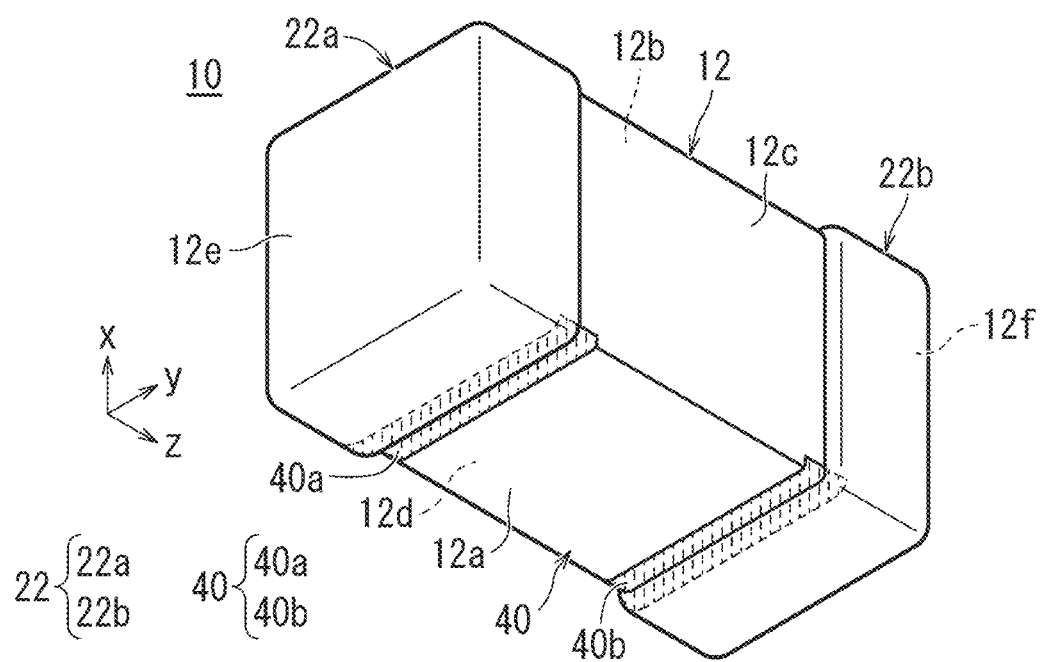
FIG. 2 is another external perspective view showing the multilayer ceramic capacitor as the exemplary multilayer ceramic electronic component according to the first preferred embodiment of the present invention.
Figure 3:
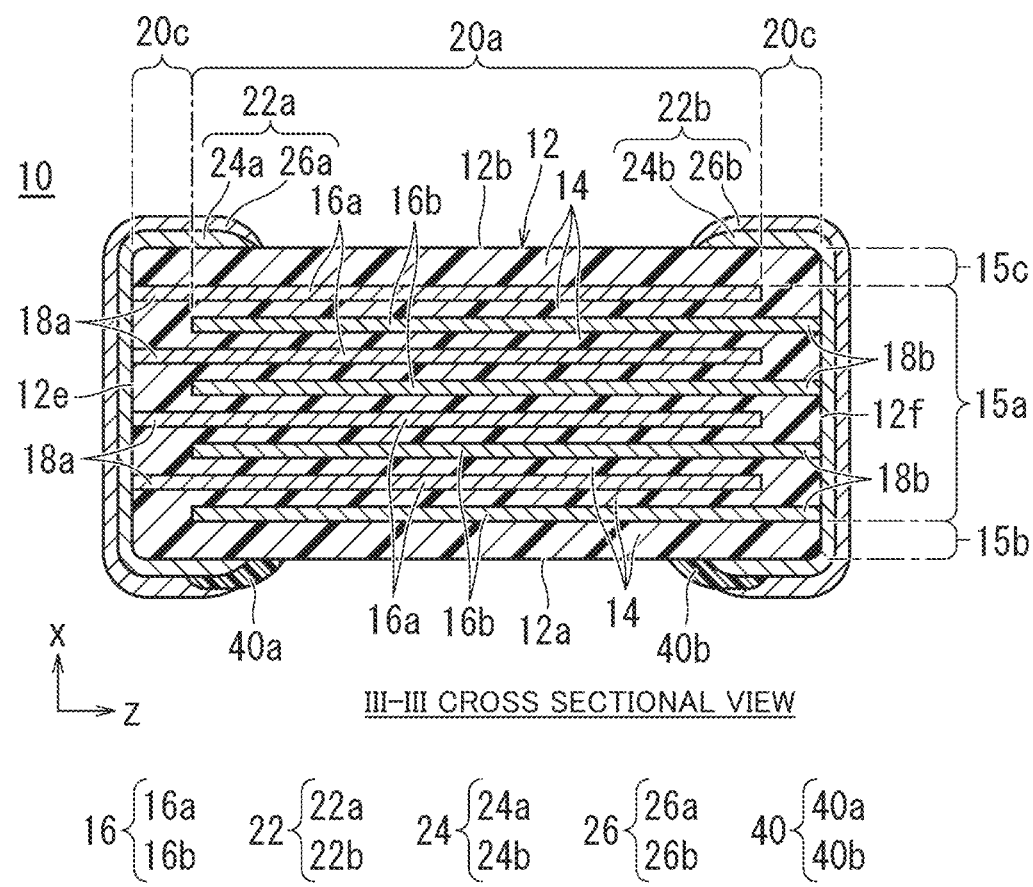
FIG. 3 is a cross sectional view taken along a line III-III in FIG. 1.
Figure 4:
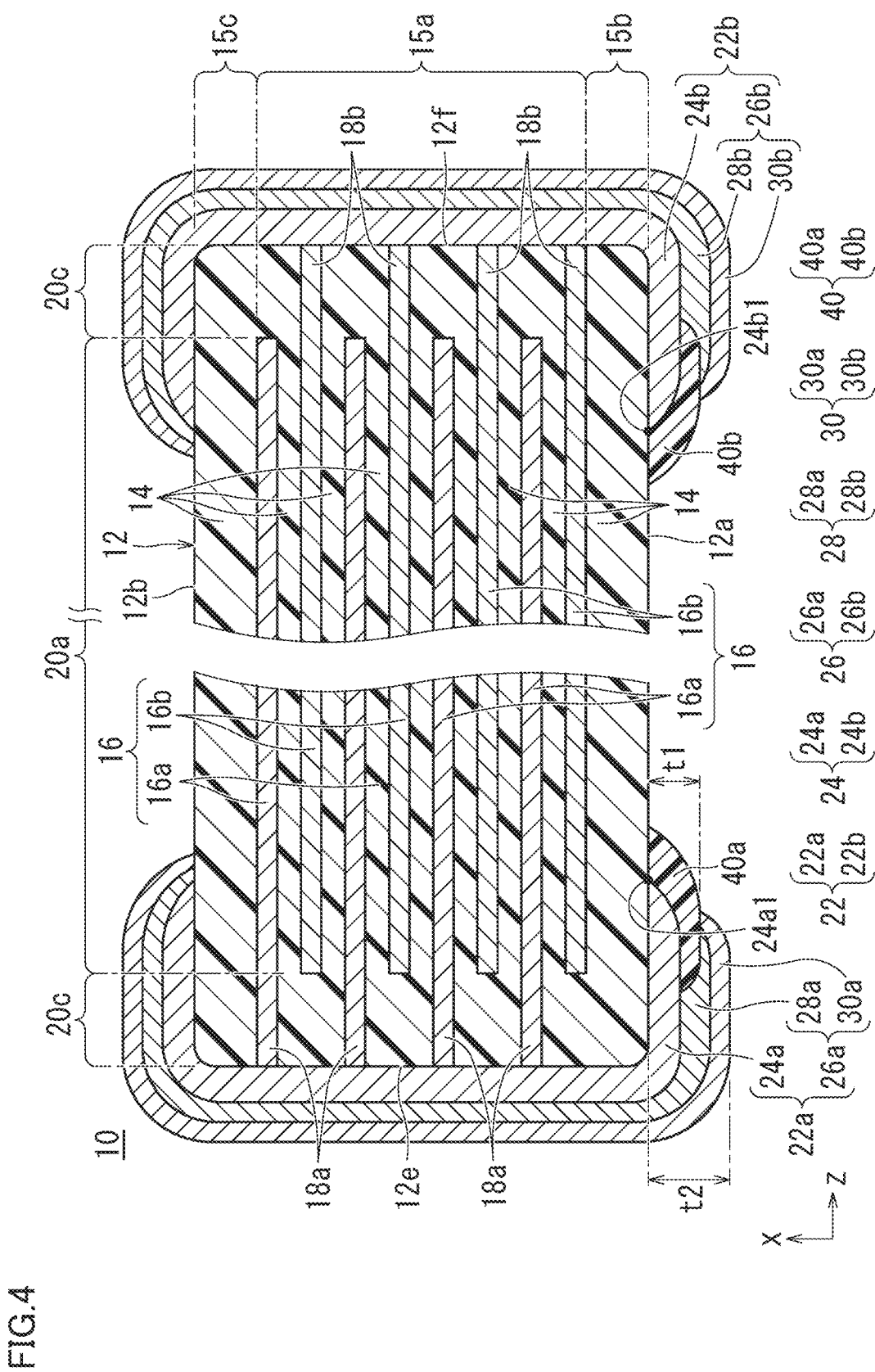
FIG. 4 is an enlarged cross sectional view of outer electrodes in the cross sectional view of the multilayer ceramic capacitor shown in FIG. 3.
Figure 5:
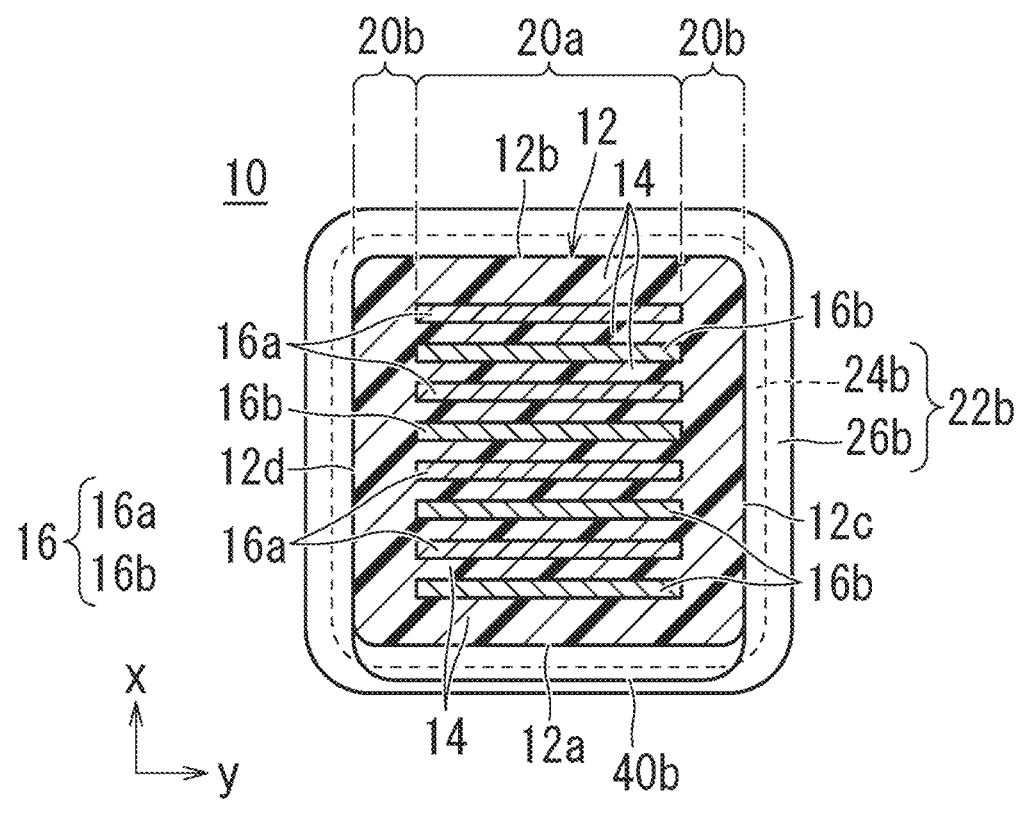
FIG. 5 is a cross sectional view taken along a line V-V in FIG. 1.

FIG. 1 is an external perspective view showing the multilayer ceramic capacitor as the exemplary multilayer ceramic electronic component according to the first preferred embodiment of the present invention. FIG. 2 is another external perspective view showing the multilayer ceramic capacitor as the exemplary multilayer ceramic electronic component according to the first preferred embodiment of the present invention. FIG. 3 is a cross sectional view taken along a line III-III in FIG. 1. FIG. 4 is an enlarged cross sectional view of outer electrodes in the cross sectional view of the multilayer ceramic capacitor shown in FIG. 3. FIG. 5 is a cross sectional view taken along a line V-V in FIG. 1.

A multilayer ceramic capacitor 10 includes a multilayer body 12 having a rectangular or substantially rectangular parallelepiped shape as shown in FIGS. 1 to 5, for example. Multilayer body 12 includes a plurality of layered ceramic layers 14 and a plurality of layered inner electrode layers 16. Further, multilayer body 12 includes a first main surface 12a and a second main surface 12b facing each other in a layering direction x, a first side surface 12c and a second side surface 12d facing each other in a width direction y orthogonal or substantially orthogonal to layering direction x, and a first end surface 12e and a second end surface 12f facing each other in a length direction z orthogonal or substantially orthogonal to layering direction x and width direction y. Multilayer body 12 preferably has rounded corners and rounded ridgeline portions. It should be noted that the term "corner portion" refers to a portion at which adjacent three surfaces of the multilayer body intersect, and the term "ridgeline portion" refers to a portion at which adjacent two surfaces of the multilayer body intersect.

For a dielectric material of each ceramic layer 14 of multilayer body 12, a dielectric ceramic including a component such as $BaTiO_3$, $CaTiO_3$, $SrTiO_3$, Pb, Fe ferrite beads, or $CaZrO_3$ may preferably be used, for example. Further, a compound such as a Mn compound, a Fe compound, a Cr compound, a Co compound or a Ni compound, for example, may be added to the component such that the content of the compound falls within a range of contents smaller than the content of the main component. A dimension of ceramic layer 14 in layering direction x is preferably more than or equal to about 0.3 μm and less than or equal to about 5.0 μm, for example.

It should be noted that when a piezoelectric ceramic is used for multilayer body 12, the multilayer ceramic electronic component defines and functions as a ceramic piezoelectric element. Specific examples of the piezoelectric ceramic material include a PZT (lead zirconate titanate)-based ceramic material and the like.

When a semiconductor ceramic is used for multilayer body 12, the multilayer ceramic electronic component defines and functions as a thermistor element. Specific examples of the semiconductor ceramic material include a spinel-based ceramic material and the like.

When a magnetic ceramic is used for multilayer body 12, the multilayer ceramic electronic component defines and functions as an inductor element. When the multilayer ceramic electronic component defines and functions as an inductor element, inner electrode layer 16 is a conductor having a coil shape. Specific examples of the magnetic ceramic material include a ferrite ceramic material and the like.

In layering direction x that connects first main surface 12a to second main surface 12b, multilayer body 12 includes an effective layer portion 15a in which inner electrode layers 16 face one another, a first outer layer portion 15b located between first main surface 12a and an inner electrode layer 16 closest to first main surface 12a, and a second outer layer portion 15c located between second main surface 12b and an inner electrode layer 16 closest to second main surface 12b.

First outer layer portion 15b includes a plurality of ceramic layers 14 located on the first main surface 12a side of multilayer body 12 and located between first main surface 12a and inner electrode layer 16 closest to first main surface 12a.

Second outer layer portion 15c includes a plurality of ceramic layers 14 located on the second main surface 12b side of multilayer body 12 and located between second main surface 12b and inner electrode layer 16 closest to second main surface 12b.

Effective layer portion 15a is a region between first outer layer portion 15b and second outer layer portion 15c.

It should be noted that the thickness of effective layer portion 15a is preferably more than or equal to about 10 μm and less than or equal to about 3000 μm, for example.

It should be noted that a dimension of multilayer body 12 in layering direction x is preferably more than or equal to about 100 μm and less than or equal to about 4 mm, a dimension of multilayer body 12 in length direction z is preferably more than or equal to about 100 μm and less than or equal to about 3 mm, and a dimension of multilayer body 12 in width direction y is preferably more than or equal to about 100 μm and less than or equal to about 3 mm, for example. The number of layered ceramic layers 14 including both outer layer portions 15b, 15c is preferably more than or equal to 100 and less than or equal to 1400, for example.

As shown in FIGS. 3 and 5, for example, multilayer body 12 includes a plurality of first inner electrode layers 16a and a plurality of second inner electrode layers 16b as the plurality of inner electrode layers 16. Each of first inner electrode layers 16a and second inner electrode layers 16b preferably has a rectangular or substantially rectangular shape, for example. The plurality of first inner electrode layers 16a and the plurality of second inner electrode layers 16b are embedded and alternately disposed at equal or substantially equal intervals along layering direction x of multilayer body 12.

On one end side of each first inner electrode layer 16a, a first drawn electrode portion 18a extends to first end surface 12e of multilayer body 12. On one end side of each second inner electrode layer 16b, a second drawn electrode portion 18b extends to second end surface 12f of multilayer body 12. Specifically, first drawn electrode portion 18a on the one end side of first inner electrode layer 16a is exposed at first end surface 12e of multilayer body 12. Second drawn electrode portion 18b on the one end side of second inner electrode layer 16b is exposed at second end surface 12f of multilayer body 12.

As shown in FIGS. 3 and 5, for example, in effective layer portion 15a of ceramic layers 14, multilayer body 12 includes a facing electrode portion 20a in which first inner electrode layers 16a and second inner electrode layers 16b face one another. Multilayer body 12 includes side portions (hereinafter, referred to as "W gaps") 20b between first side surface 12c and one end of facing electrode portion 20a in width direction y and between second side surface 12d and the other end of facing electrode portion 20a in width direction y. Further, multilayer body 12 includes end portions (hereinafter, referred to as "L gaps") 20c between second end surface 12f and an end portion of first inner electrode layer 16a opposite to first drawn electrode portion 18a and between first end surface 12e and an end portion of second inner electrode layer 16b opposite to second drawn electrode portion 18b. Here, the length of each L gap 20c defining and functioning as the end portion of multilayer body 12 is preferably more than or equal to about 10 μm and less than or equal to about 300 μm, for example. The length of each W gap 20b defining and functioning as the side portion of multilayer body 12 is preferably more than or equal to about 5 μm and less than or equal to about 300 μm, for example.

In multilayer body 12, for example, as shown in FIGS. 3 and 5, first inner electrode layers 16a and second inner electrode layers 16b face one another with ceramic layers 14 being interposed therebetween in facing electrode portion 20a, thus providing a capacitance. Therefore, a capacitance can be obtained between a first outer electrode 22a to which first inner electrode layers 16a are connected and a second outer electrode 22b to which second inner electrode layers 16b are connected. Therefore, the multilayer ceramic electronic component having such a structure defines and functions as a capacitor.

Each inner electrode layer 16 preferably includes, for example, a metal such as Ni, Cu, or Ag. Inner electrode layer 16 may further include dielectric particles having the same or similar composition as the ceramic included in ceramic layer 14. The thickness of inner electrode layer 16 is preferably more than or equal to about 0.1 μm and less than or equal to about 3.0 μm, for example.

Outer electrodes 22 are provided on the first end surface 12e side and the second end surface 12f side of multilayer body 12. Outer electrodes 22 include first outer electrode 22a and second outer electrode 22b.

First outer electrode 22a is provided on the first end surface 12e side of multilayer body 12. First outer electrode 22a covers first end surface 12e of multilayer body 12 and extends from first end surface 12e so as to cover portions of first main surface 12a, second main surface 12b, first side surface 12c, and second side surface 12d. In this case, first outer electrode 22a is electrically connected to first drawn electrode portions 18a of first inner electrode layers 16a.

Second outer electrode 22b is provided on the second end surface 12f side of multilayer body 12. Second outer electrode 22b covers second end surface 12f of multilayer body 12 and extends from second end surface 12f so as to cover portions of first main surface 12a, second main surface 12b, first side surface 12c, and second side surface 12d. In this case, second outer electrode 22b is electrically connected to second drawn electrode portions 18b of second inner electrode layers 16b.

As shown in FIG. 3, each of first outer electrode 22a and second outer electrode 22b includes an underlying electrode layer 24 and a plating layer 26, which are provided in this order from the multilayer body 12 side.

Underlying electrode layers 24 include a first underlying electrode layer 24a and a second underlying electrode layer 24b.

First underlying electrode layer 24a is disposed on first end surface 12e of multilayer body 12 and extends from first end surface 12e so as to cover respective portions of first main surface 12a, second main surface 12b, first side surface 12c, and second side surface 12d.

Second underlying electrode layer 24b is disposed on second end surface 12f of multilayer body 12 and extends from second end surface 12f so as to cover respective portions of first main surface 12a, second main surface 12b, first side surface 12c, and second side surface 12d.

Each of underlying electrode layers 24 includes at least one selected from a baked layer, a resin layer, a thin film layer, and the like, for example. The baked layer includes, for example, a glass component including Si, and Cu as a metal component. Examples of the metal component of the baked layer include at least one selected from Cu, Ni, Ag, Pd, a Ag—Pd alloy, Au, and the like. The baked layer is formed by applying a conductive paste including the glass component and the metal component onto multilayer body 12 and then baking it. The baked layer may be calcined together with inner electrode layers 16 or may be baked after calcining ceramic layers 14 and inner electrode layers 16. The baked layer may include a plurality of layers. The thickest portion of the baked layer preferably has a thickness of more than or equal to about 10 μm and less than or equal to about 150 μm, for example.

The resin layer may be provided on the baked layer, or may be provided directly on multilayer body 12 without providing the baked layer. Further, the resin layer may include a plurality of layers.

When the resin layer is formed on the baked layer, the resin layer may be a resin layer including conductive particles and a thermosetting resin, for example. The thickest portion of the resin layer preferably has a thickness of more than or equal to about 0.1 μm and less than or equal to about 50 μm, for example.

The thin film layer is formed by a thin film formation method, such as a sputtering method or a vapor deposition method, for example. The thin film layer preferably has a thickness of less than or equal to about 1 µm in which metal particles are deposited.

Plating layers 26 preferably include a first plating layer 26a and a second plating layer 26b, for example.

First plating layer 26a covers first underlying electrode layer 24a. Specifically, first plating layer 26a is preferably disposed on the surface of first underlying electrode layer 24a on first end surface 12e and preferably extends to the surface of first underlying electrode layer 24a on first main surface 12a, second main surface 12b, first side surface 12c, and second side surface 12d. It should be noted that first plating layer 26a covers a portion of a surface of a first insulating layer 40a disposed on the first main surface 12a side.

Second plating layer 26b covers second underlying electrode layer 24b. Specifically, second plating layer 26b is preferably disposed on the surface of second underlying electrode layer 24b on second end surface 12f and preferably extends to the surface of second underlying electrode layer 24b on first main surface 12a, second main surface 12b, first side surface 12c, and second side surface 12d. It should be noted that second plating layer 26b covers a portion of a surface of a below-described second insulating layer 40b disposed on the first main surface 12a side.

Examples of each plating layer 26 used herein include at least one selected from Cu, Ni, Sn, Ag, Pd, an Ag—Pd alloy, Au, and the like.

Plating layer 26 may include a plurality of layers. In this case, plating layer 26 preferably has a two-layer structure including a lower plating layer 28 and an upper plating layer 30. Lower plating layer 28 is preferably provided, for example, using Ni plating on underlying electrode layer 24. Upper plating layer 30 is preferably provided, for example, using Sn plating on lower plating layer 28.

That is, first plating layer 26a includes a first lower plating layer 28a and a first upper plating layer 30a located on a surface of first lower plating layer 28a.

Second plating layer 26b includes a second lower plating layer 28b and a second upper plating layer 30b located on a surface of second lower plating layer 28b.

Lower plating layer 28 provided using Ni plating prevents underlying electrode layer 24 from being eroded by a solder when mounting multilayer ceramic capacitor 10. Upper plating layer 30 provided using Sn plating facilitates mounting by improving wettability of the solder when mounting multilayer ceramic capacitor 10.

The thickness of each one plating layer is preferably more than or equal to about 0.1 µm and less than or equal to about 5.0 µm, for example.

It should be noted that when outer electrode 22 is defined by a plating layer, outer electrode 22 includes a plating layer provided directly on multilayer body 12 and connected directly to inner electrode layer 16. In this case, a catalyst may be provided on multilayer body 12 as a pretreatment. Moreover, the plating layer preferably includes a lower plating layer and an upper plating layer provided on the lower plating layer. Each of the lower plating layer and the upper plating layer preferably includes, for example, plating of one metal selected from a group consisting of Cu, Ni, Sn, Pb, Au, Ag, Pd, Bi, and Zn, or plating of an alloy including the metal. For example, when Ni is used as the inner electrode layer, Cu, for example, which has excellent bondability with respect to Ni, is preferably used as the lower plating layer. Sn or Au, for example, each of which has excellent solder wettability, is preferably used as the upper plating layer. As the lower plating layer, Ni having a solder barrier property is preferably used.

The upper plating layer may be provided as desired. Outer electrode 22 may include the lower plating layer. The upper plating layer may be provided as an outermost layer of the plating layer. Another plating layer may be provided on the upper plating layer. The thickness of each one plating layer is preferably more than or equal to about 1 µm and less than or equal to about 10 µm, for example. The plating layer preferably includes no glass. A metal ratio of the plating layer per unit volume is preferably more than or equal to about 99 volume %, for example. Further, the plating layer is preferably formed by grain growth along the thickness direction and has a pillar shape.

An insulating layer 40 covers only an entirety or substantially an entirety of an end edge portion of outer electrode 22 disposed on the first main surface 12a side of multilayer body 12. Insulating layer 40 continuously extends from a surface of ceramic layer 14 at first main surface 12a of multilayer body 12 so as to cover an end edge of first outer electrode 22a located on first main surface 12a, and continuously extends from a surface of ceramic layer 14 at first main surface 12a of multilayer body 12 so as to cover an end edge of second outer electrode 22b located on first main surface 12a. In multilayer ceramic capacitor 10 according to the present preferred embodiment, insulating layer 40 covers only an entirety or substantially an entirety of the end edge portion of underlying electrode layer 24.

Insulating layer 40 includes first insulating layer 40a and second insulating layer 40b.

First insulating layer 40a covers only an entirety or substantially an entirety of an end edge portion 24a1 of first underlying electrode layer 24a located on the first main surface 12a side. More specifically, first insulating layer 40a continuously extends from the surface of ceramic layer 14 at first main surface 12a of multilayer body 12 to the surface of first underlying electrode layer 24a located on the first main surface 12a side.

Second insulating layer 40b covers only an entirety or substantially an entirety of an end edge portion 24b1 of second underlying electrode layer 24b located on first main surface 12a. More specifically, second insulating layer 40b continuously extends from the surface of ceramic layer 14 at first main surface 12a of multilayer body 12 to the surface of second underlying electrode layer 24b located on the first main surface 12a side.

A portion of first plating layer 26a located on the first main surface 12a side covers a portion of the surface of first insulating layer 40a.

A portion of second plating layer 26b located on the first main surface 12a side covers a portion of the surface of second insulating layer 40b.

Here, t2>t1 is satisfied, where t1 represents each of a dimension from the surface of first main surface 12a of multilayer body 12 to the first-main-surface-12a-side surface of first insulating layer 40a in layering direction x and a dimension from the surface of first main surface 12a of multilayer body 12 to the first main-surface-12a-side surface of second insulating layer 40b in layering direction x, and t2 represents each of a dimension from the surface of first main surface 12a of multilayer body 12 to the first-main-surface-12a-side surface of first plating layer 26a (first outer electrode 22a) in layering direction x and a dimension from the surface of first main surface 12a of multilayer body 12 to the first-main-surface-12a-side surface of second plating layer 26b (second outer electrode 22b) in layering direction x.

Thus, multilayer ceramic capacitor 10 can be stably mounted on a mounting substrate.

An end edge of first insulating layer 40a located on the first end surface 12e side is preferably located on an outer side, i.e., the first end surface 12e side, with respect to facing electrode portion 20a in length direction z, facing electrode portion 20a being a portion in which first inner electrode layer 16a and second inner electrode layer 16b face each other. An end edge of second insulating layer 40b located on the second end surface 12f side is preferably located on an outer side, i.e., the second end surface 12f side, with respect to facing electrode portion 20a in length direction z, facing electrode portion 20a being a portion in which first inner electrode layer 16a and second inner electrode layer 16b face each other. Thus, stress concentrated at each of the end edge portion of first outer electrode 22a and the end edge portion of second outer electrode 22b located on first main surface 12a can be located on both of the end surfaces 12e, 12f sides, so as to reduce or prevent the occurrence of cracks in the effective layer portion.

Insulating layer 40 may be made of a ceramic. When insulating layer 40 is made of a ceramic, at least one selected from $Al_2O_3$, PZT, SiC, $SiO_2$, MgO, and the like, for example, is preferably used. When insulating layer 40 is made of a ceramic, mechanical strength of multilayer ceramic capacitor 10 against stress can be further improved. When insulating layer 40 is made of a ceramic, the grain size of the ceramic included in insulating layer 40 is preferably smaller than the grain size of the ceramic included in ceramic layer 14.

When insulating layer 40 is made of a resin, insulating layer 40 may preferably include, for example, one or more of an epoxy resin, a silicone resin, a fluorine resin, a phenol resin, a urea resin, a melamine resin, an unsaturated polyester resin, barium titanate, alumina, silica, yttria, and zirconia. In this case, a thermosetting epoxy resin, which includes the same metal oxide as that used as a solder resist for printed boards, a silicone resin, a fluorine-based resin, a phenol-based resin, a melamine resin, barium titanate, alumina, silica, or the like is suitably used.

It should be noted that a boundary line between multilayer body 12 and insulating layer 40 can be distinguished by using energy dispersive X-ray spectroscopy (EDX). When the component of ceramic layer 14 of multilayer body 12 is the same or substantially the same as the component of insulating layer 40, the boundary line between multilayer body 12 and insulating layer 40 can be distinguished by observation with a focused ion beam scanning electron microscope (FIB-SEM) or the like.

A filling factor of insulating layer 40 is calculated as follows. That is, a cross section of multilayer body 12 (hereinafter, referred to as "LT cross section") including length direction z and layering direction x at the central portion of multilayer ceramic capacitor 10 in width direction y is exposed and multilayer ceramic capacitor 10 is polished. Then, an amount of voids in the LT cross section is measured using a focused ion beam scanning electron microscope (FIB-SEM), thus determining the filling factor of insulating layer 40. More specifically, by performing image processing on an image in a predetermined field of view, void portions and the other portions are distinguished from one another to calculate a ratio of the regions other than the void portions with respect to the whole of the image in the field of view, thereby calculating the filling factor.

The thickness of insulating layer 40 is preferably less than or equal to about 5 μm, for example. When the thickness is less than or equal to about 5 μm, multilayer ceramic capacitor 10 can be stably mounted on a mounting substrate. The thickness of insulating layer 40 is measured as the thickness of insulating layer 40 at a central portion in the cross section of the central portion in width direction y.

In multilayer ceramic capacitor 10 shown in FIG. 1, first insulating layer 40a extends continuously from the surface of ceramic layer 14 at first main surface 12a of multilayer body 12 to the surface of first underlying electrode layer 24a located on the first main surface 12a side, and second insulating layer 40b extends continuously from the surface of ceramic layer 14 at first main surface 12a of multilayer body 12 to the surface of second underlying electrode layer 24b located on the first main surface 12a side. Thus, when multilayer ceramic capacitor 10 is mounted on a mounting substrate, portions of multilayer ceramic capacitor 10 on which stress is concentrated are covered with insulating layers 40a, 40b, with the result that multilayer ceramic capacitor 10 can have improved mechanical strength against stress.

In multilayer ceramic capacitor 10 shown in FIG. 1, t2>t1 is satisfied, where t1 represents each of the dimension from the surface of first main surface 12a of multilayer body 12 to the first-main-surface-12a-side surface of first insulating layer 40a in layering direction x and the dimension from the surface of first main surface 12a of multilayer body 12 to the first main-surface-12a-side surface of second insulating layer 40b in layering direction x, and t2 represents each of the dimension from the surface of first main surface 12a of multilayer body 12 to the first-main-surface-12a-side surface of first plating layer 26a (first outer electrode 22a) in layering direction x and the dimension from the surface of first main surface 12a of multilayer body 12 to the first-main-surface-12a-side surface of second plating layer 26b (second outer electrode 22b) in layering direction x. Thus, when mounting multilayer ceramic capacitor 10 on a mounting substrate, outer electrodes 22 are brought into contact with solders disposed on upper surfaces of land electrodes disposed on the mounting substrate prior to insulating layers 40a, 40b, such that multilayer ceramic capacitor 10 can be stably mounted on the mounting substrate. Thus, a problem such as a tombstone phenomenon, for example, is reduced or prevented.

First Modification of First Preferred Embodiment

Next, a multilayer ceramic capacitor will be described as an exemplary multilayer ceramic electronic component according to a first modification of the first preferred embodiment of the present invention. It should be noted that although a multilayer ceramic capacitor 10A will be described as an exemplary multilayer ceramic electronic component in the present preferred embodiment, the multilayer ceramic electronic component is not limited to the multilayer ceramic capacitor.

Multilayer ceramic capacitor 10A according to the first modification has the same or substantially the same configuration as that of multilayer ceramic capacitor 10, except that an insulating layer 40A covers underlying electrode layer 24 and is disposed between a plurality of plating layers of plating layer 26. Therefore, the same or substantially the same portions as those of multilayer ceramic capacitor 10 are denoted by the same reference characters and will not be described.

Figure 6:
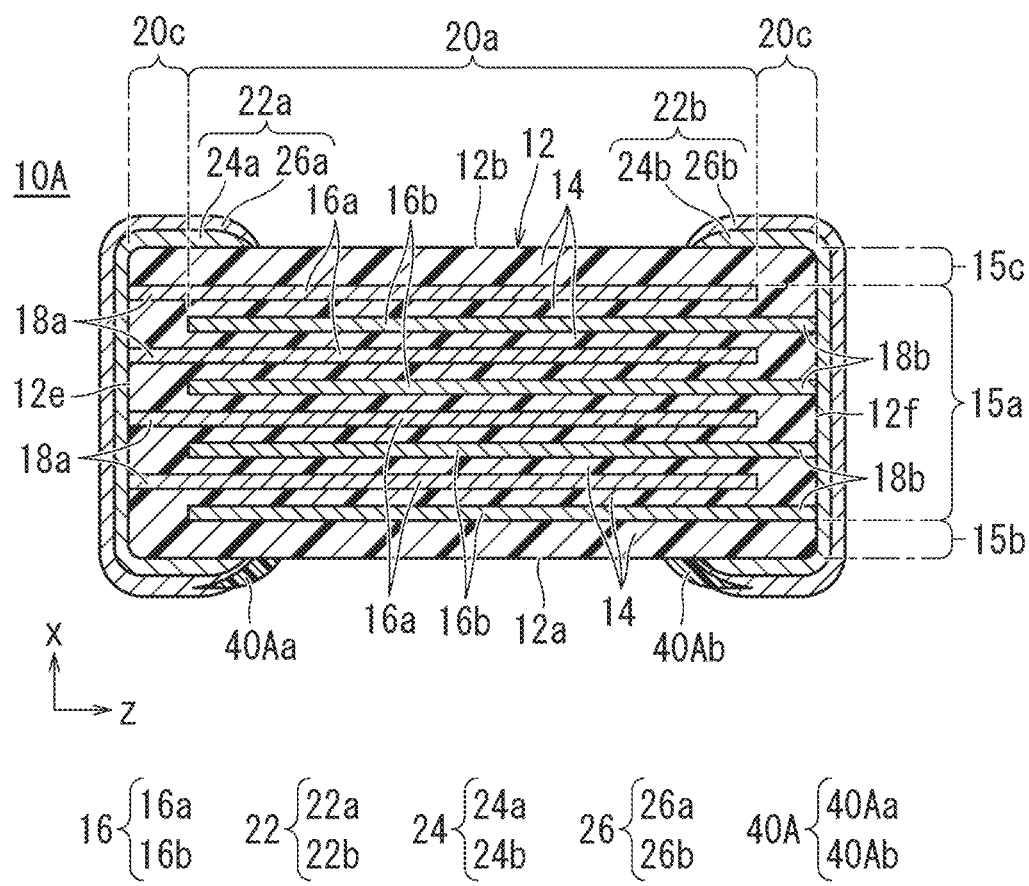
FIG. 6 is a cross sectional view corresponding to FIG. 3 and showing a multilayer ceramic capacitor as an exemplary multilayer ceramic electronic component according to a first modification of the first preferred embodiment of the present invention.
Figure 7:
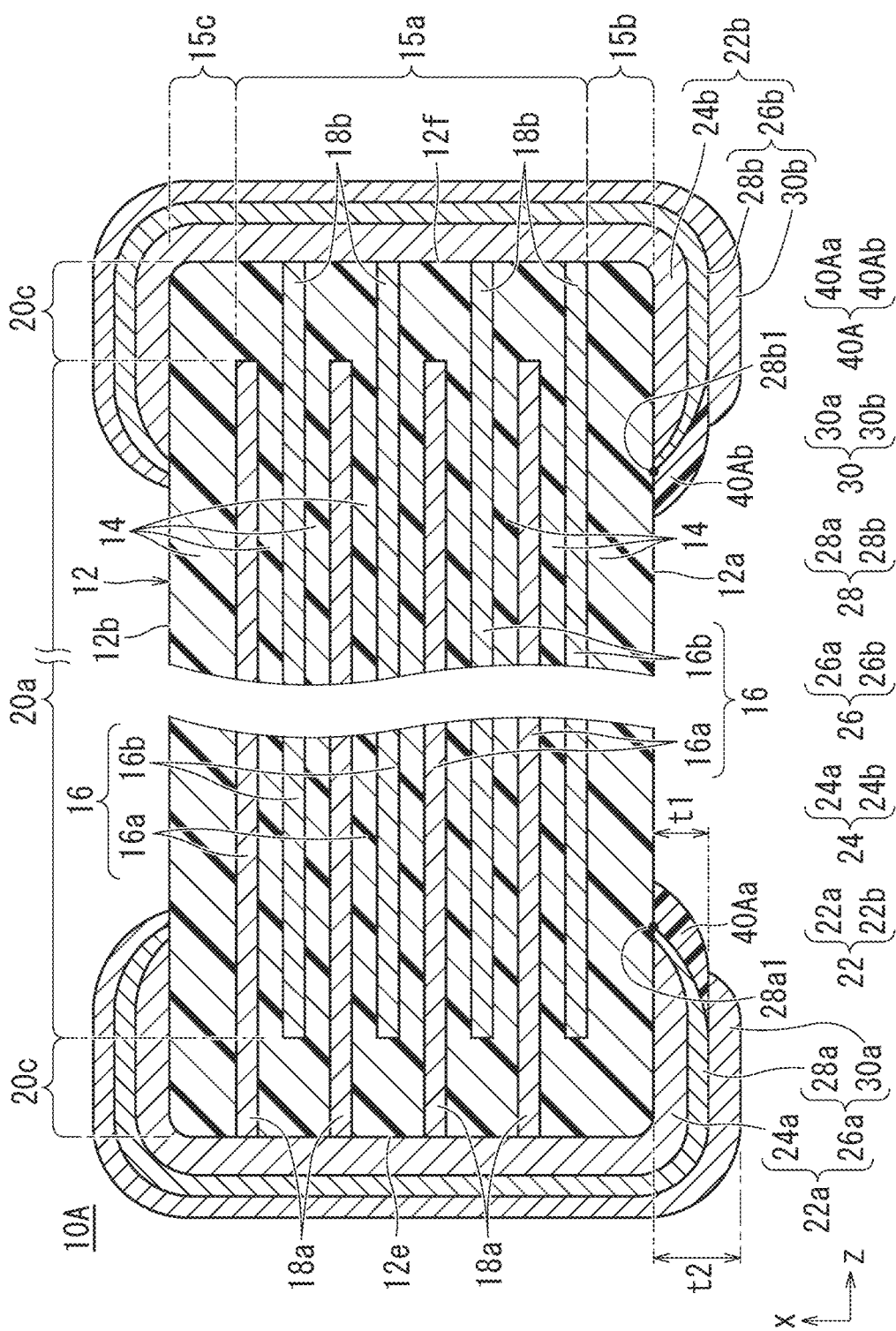
FIG. 7 is an enlarged cross sectional view of outer electrodes in the cross sectional view of the multilayer ceramic capacitor shown in FIG. 6.

FIG. 6 is a cross sectional view corresponding to FIG. 3 and showing the multilayer ceramic capacitor as the exemplary multilayer ceramic electronic component according to the first modification of the first preferred embodiment of the present invention. FIG. 7 is an enlarged cross sectional view of outer electrodes in the cross sectional view of the multilayer ceramic capacitor shown in FIG. 6.

As shown in FIG. 6, each of first outer electrode 22a and second outer electrode 22b includes underlying electrode layer 24 and plating layer 26, which are provided in this order from the multilayer body 12 side.

Underlying electrode layers 24 include a first underlying electrode layer 24a and a second underlying electrode layer 24b.

First underlying electrode layer 24a is disposed on a surface of first end surface 12e of multilayer body 12 and extends from first end surface 12e so as to cover respective portions of first main surface 12a, second main surface 12b, first side surface 12c, and second side surface 12d.

Second underlying electrode layer 24b is disposed on second end surface 12f of multilayer body 12 and extends from second end surface 12f so as to cover respective portions of first main surface 12a, second main surface 12b, first side surface 12c, and second side surface 12d.

Plating layers 26 include a first plating layer 26a and a second plating layer 26b.

First plating layer 26a covers first underlying electrode layer 24a. Specifically, first plating layer 26a is preferably disposed on the surface of first underlying electrode layer 24a on first end surface 12e and preferably extends to the surface of first underlying electrode layer 24a on first main surface 12a, second main surface 12b, first side surface 12c, and second side surface 12d. It should be noted that first plating layer 26a covers a portion of a surface of a first insulating layer 40Aa disposed on the first main surface 12a side.

Second plating layer 26b covers second underlying electrode layer 24b. Specifically, second plating layer 26b is preferably disposed on the surface of second underlying electrode layer 24b on second end surface 12f and preferably extends to the surface of second underlying electrode layer 24b on first main surface 12a, second main surface 12b, first side surface 12c, and second side surface 12d. It should be noted that second plating layer 26b covers a portion of a surface of a below-described second insulating layer 40Ab disposed on the first main surface 12a side.

Each of plating layers 26 includes a plurality of layers. In this case, plating layer 26 preferably has a two-layer structure including a lower plating layer 28 and an upper plating layer 30. Lower plating layer 28 is preferably provided using, for example, Ni plating on underlying electrode layer 24. Upper plating layer 30 is preferably provided using, for example, Sn plating on lower plating layer 28.

That is, first plating layer 26a includes a first lower plating layer 28a and a first upper plating layer 30a located on a surface of lower plating layer 28a.

Second plating layer 26b includes a second lower plating layer 28b and a second upper plating layer 30b located on a surface of second lower plating layer 28b.

Insulating layer 40A covers only an entirety or substantially an entirety of an end edge portion of lower plating layer 28 covering underlying electrode layer 24 disposed on the first main surface 12a side of multilayer body 12.

Insulating layer 40A includes a first insulating layer 40Aa and a second insulating layer 40Ab.

First insulating layer 40Aa covers only an entirety or substantially an entirety of an end edge portion 28a1 of first lower plating layer 28a located on the first main surface 12a side. More specifically, first insulating layer 40Aa continuously extends from the surface of ceramic layer 14 at first main surface 12a of multilayer body 12 to the surface of first lower plating layer 28a located on the first main surface 12a side.

Second insulating layer 40Ab covers only an entirety or substantially an entirety of an end edge portion 28b1 of second lower plating layer 28b located on first main surface 12a. More specifically, second insulating layer 40Ab continuously extends from the surface of ceramic layer 14 at first main surface 12a of multilayer body 12 to the surface of second lower plating layer 28b located on the first main surface 12a side.

A portion of first plating layer 26a located on the first main surface 12a side covers a portion of the surface of first insulating layer 40Aa. More specifically, a portion of first upper plating layer 30a located on the first main surface 12a side covers a portion of the surface of first insulating layer 40Aa.

A portion of second plating layer 26b located on the first main surface 12a side covers a portion of the surface of second insulating layer 40Ab. More specifically, a portion of second upper plating layer 30b located on the first main surface 12a side covers a portion of the surface of second insulating layer 40Ab.

Here, $t2>t1$ is satisfied, where t1 represents each of a dimension from the surface of first main surface 12a of multilayer body 12 to the first-main-surface-12a-side surface of first insulating layer 40Aa in layering direction x and a dimension from the surface of first main surface 12a of multilayer body 12 to the first-main-surface-12a-side surface of second insulating layer 40Ab in layering direction x, and t2 represents each of a dimension from the surface of first main surface 12a of multilayer body 12 to the first-main-surface-12a-side surface of first plating layer 26a (first outer electrode 22a) in layering direction x and a dimension from the surface of first main surface 12a of multilayer body 12 to the first-main-surface-12a-side surface of second plating layer 26b (second outer electrode 22b) in layering direction x.

Thus, multilayer ceramic capacitor 10 can be stably mounted on a mounting substrate.

Multilayer ceramic capacitor 10A according to the first modification of the first preferred embodiment shown in FIGS. 6 and 7 provides the same or substantially the same advantageous effect as that of multilayer ceramic capacitor 10 according to the first preferred embodiment.

Second Modification of First Preferred Embodiment

A multilayer ceramic capacitor will be described as an exemplary multilayer ceramic electronic component according to a second modification of the first preferred embodiment of the present invention. It should be noted that although a multilayer ceramic capacitor 10B will be described as an exemplary multilayer ceramic electronic component in the present preferred embodiment, the multilayer ceramic electronic component is not limited to the multilayer ceramic capacitor.

Multilayer ceramic capacitor 10B according to the second modification of the first preferred embodiment has the same or substantially the same structure as that of multilayer ceramic capacitor 10 according to the first preferred embodiment shown in FIG. 1, except that plating layer 26 located on the first main surface 12a side of multilayer body 12 does not cover an insulating layer 40B. Therefore, the same or substantially the same portions as those of multilayer ceramic capacitor 10 are denoted by the same reference characters and will not be described.

Figure 8:
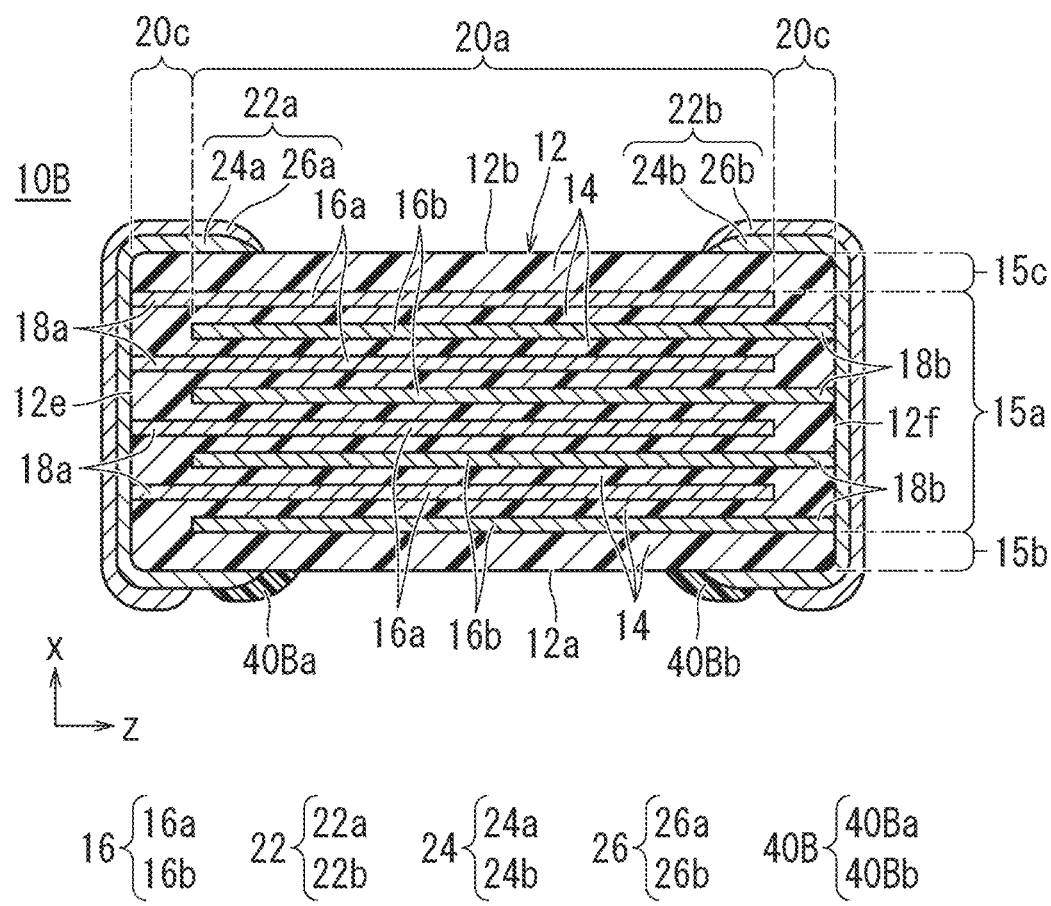
FIG. 8 is a cross sectional view corresponding to FIG. 3 and showing a multilayer ceramic capacitor as an exemplary multilayer ceramic electronic component according to a second modification of the first preferred embodiment of the present invention.
Figure 9:
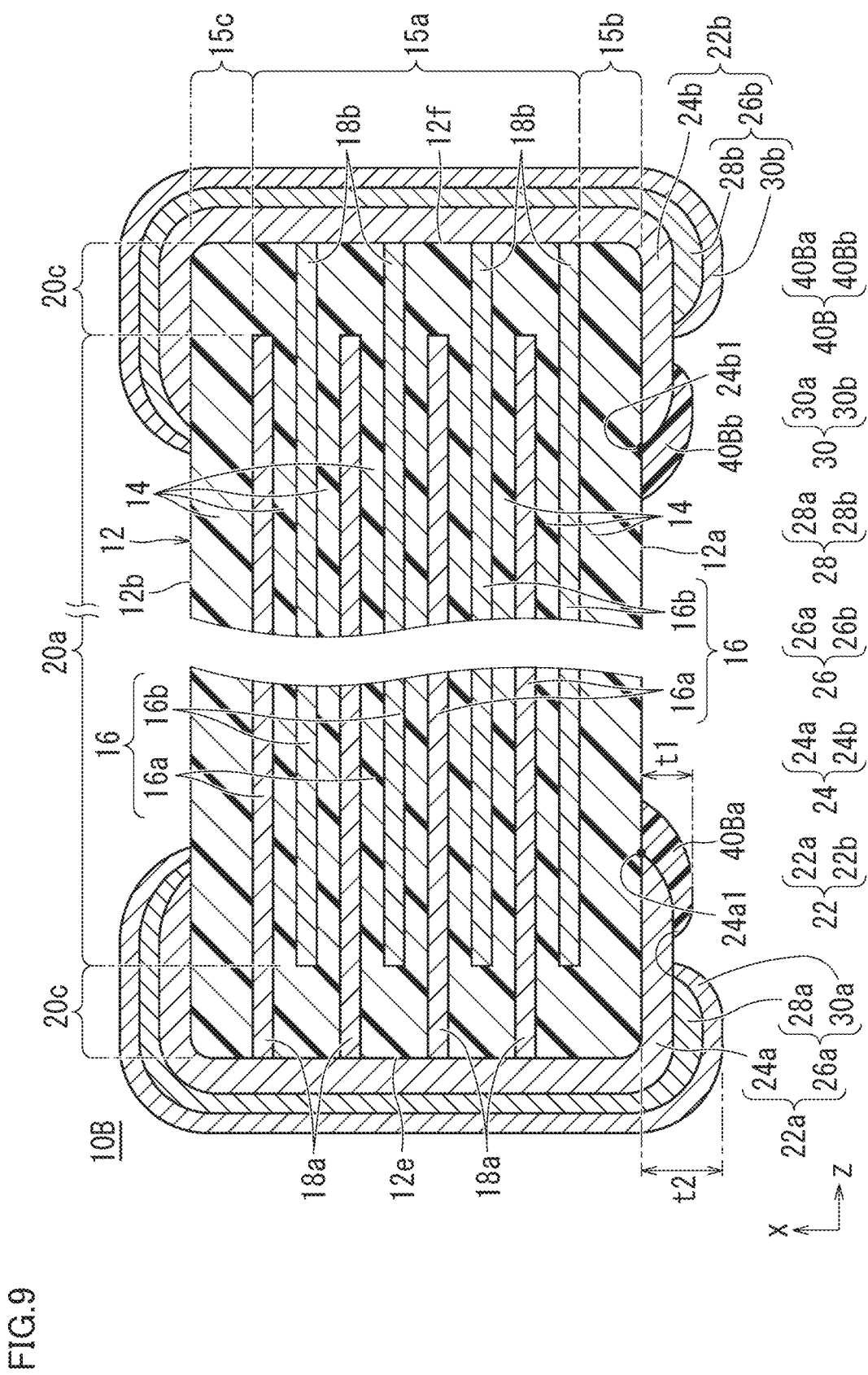
FIG. 9 is an enlarged cross sectional view of outer electrodes in the cross sectional view of the multilayer ceramic capacitor shown in FIG. 8.

FIG. 8 is a cross sectional view corresponding to FIG. 3 and showing the multilayer ceramic capacitor as the exemplary multilayer ceramic electronic component according to the second modification of the first preferred embodiment of the present invention. FIG. 9 is an enlarged cross sectional view of outer electrodes in the cross sectional view of the multilayer ceramic capacitor shown in FIG. 8.

As shown in FIG. 8, each of first outer electrode 22a and second outer electrode 22b includes an underlying electrode layer 24 and a plating layer 26, which are provided in this order from the multilayer body 12 side.

Underlying electrode layers 24 include a first underlying electrode layer 24a and a second underlying electrode layer 24b.

First underlying electrode layer 24a is disposed on first end surface 12e of multilayer body 12 and extends from first end surface 12e so as to cover respective portions of first main surface 12a, second main surface 12b, first side surface 12c, and second side surface 12d.

Second underlying electrode layer 24b is disposed on second end surface 12f of multilayer body 12 and extends from second end surface 12f so as to cover respective portions of first main surface 12a, second main surface 12b, first side surface 12c, and second side surface 12d.

Plating layers 26 include a first plating layer 26a and a second plating layer 26b.

First plating layer 26a covers a portion of first underlying electrode layer 24a. Specifically, first plating layer 26a is preferably disposed on the surface of first underlying electrode layer 24a on first end surface 12e, and preferably extends to the surface of first underlying electrode layer 24a on portions of first main surface 12a, second main surface 12b, first side surface 12c, and second side surface 12d. It should be noted that first plating layer 26a does not cover a surface of a first insulating layer 40Ba disposed on the first main surface 12a side.

Second plating layer 26b covers a portion of second underlying electrode layer 24b. Specifically, second plating layer 26b is preferably disposed on the surface of second underlying electrode layer 24b on second end surface 12f, and preferably extends to the surface of second underlying electrode layer 24b on portions of first main surface 12a, second main surface 12b, first side surface 12c, and second side surface 12d. It should be noted that second plating layer 26b does not cover a surface of a second insulating layer 40Bb disposed on the first main surface 12a side.

Insulating layer 40B covers only an entirety or substantially an entirety of an end edge portion of underlying electrode layer 24 disposed on the first main surface 12a side of multilayer body 12.

Insulating layer 40B includes a first insulating layer 40Ba and a second insulating layer 40Bb.

First insulating layer 40Ba covers only an entirety or substantially an entirety of an end edge portion 24a1 of first underlying electrode layer 24a located on the first main surface 12a side. More specifically, first insulating layer 40Ba continuously extends from the surface of ceramic layer 14 at first main surface 12a of multilayer body 12 to the surface of first underlying electrode layer 24a located on the first main surface 12a side.

Second insulating layer 40Bb covers only an entirety or substantially an entirety of an end edge portion 24b1 of second underlying electrode layer 24b located on first main surface 12a. More specifically, second insulating layer 40Bb continuously extends from the surface of ceramic layer 14 at first main surface 12a of multilayer body 12 to the surface of second underlying electrode layer 24b located on the first main surface 12a side.

The surface of first insulating layer 40Ba is not covered with first plating layer 26a located on the first main surface 12a side.

The surface of second insulating layer 40Bb is not covered with second plating layer 26b located on the first main surface 12a side.

Here, t2>t1 is satisfied, where t1 represents each of a dimension from the surface of first main surface 12a of multilayer body 12 to the first-main-surface-12a side surface of first insulating layer 40Ba in layering direction x and a dimension from the surface of first main surface 12a of multilayer body 12 to the first-main-surface-12a-side surface of second insulating layer 40Bb in layering direction x, and t2 represents each of a dimension from the surface of first main surface 12a of multilayer body 12 to the first-main-surface-12a-side surface of first plating layer 26a (first outer electrode 22a) in layering direction x and a dimension from the surface of first main surface 12a of multilayer body 12 to the first-main-surface-12a-side surface of second plating layer 26b (second outer electrode 22b) in layering direction x.

Thus, multilayer ceramic capacitor 10 can be stably mounted on a mounting substrate.

Multilayer ceramic capacitor 10B according to the second modification of the first preferred embodiment shown in FIGS. 8 and 9 provides the same or substantially the same advantageous effect as that of multilayer ceramic capacitor 10 according to the first preferred embodiment.

Second Preferred Embodiment

A multilayer ceramic capacitor will be described as an exemplary multilayer ceramic electronic component according to a second preferred embodiment of the present invention. It should be noted that although a multilayer ceramic capacitor 10C will be described as an exemplary multilayer ceramic electronic component in the present preferred embodiment, the multilayer ceramic electronic component is not limited to the multilayer ceramic capacitor.

Multilayer ceramic capacitor 10C according to the second preferred embodiment has the same or substantially the same configuration as that of multilayer ceramic capacitor 10, except that an insulating layer 40C covers an entirety or substantially an entirety of the first main surface 12a side of multilayer ceramic capacitor 10C and each outer electrode 22 further includes an outermost electrode 50 at the outermost portion thereof. Therefore, the same or substantially the same portions as those of multilayer ceramic capacitor 10 are denoted by the same reference characters and will not be described.

Figure 10:
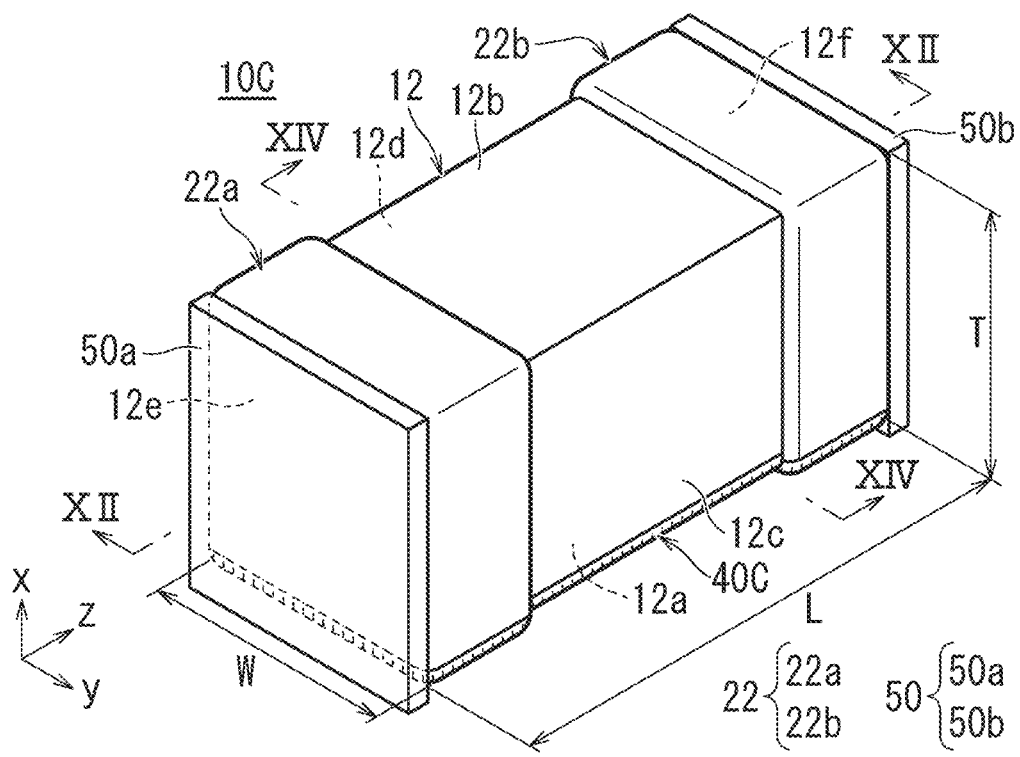
FIG. 10 is an external perspective view showing a multilayer ceramic capacitor as an exemplary multilayer ceramic electronic component according to a second preferred embodiment of the present invention.
Figure 11:
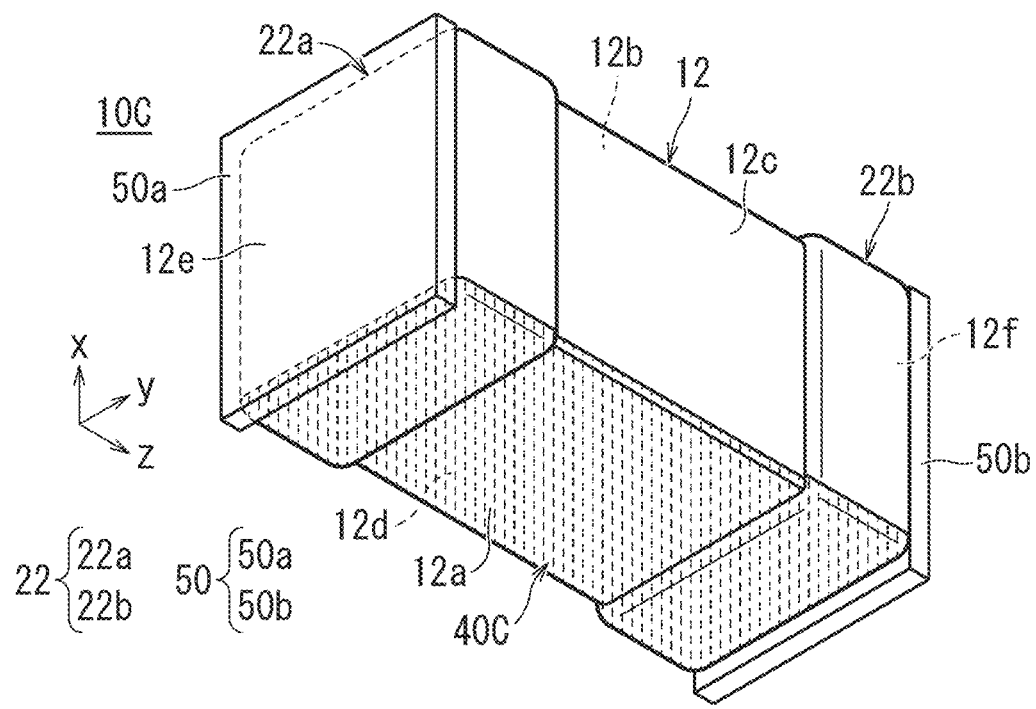
FIG. 11 is another external perspective view showing the multilayer ceramic capacitor as the exemplary multilayer ceramic electronic component according to the second preferred embodiment of the present invention.
Figure 12:
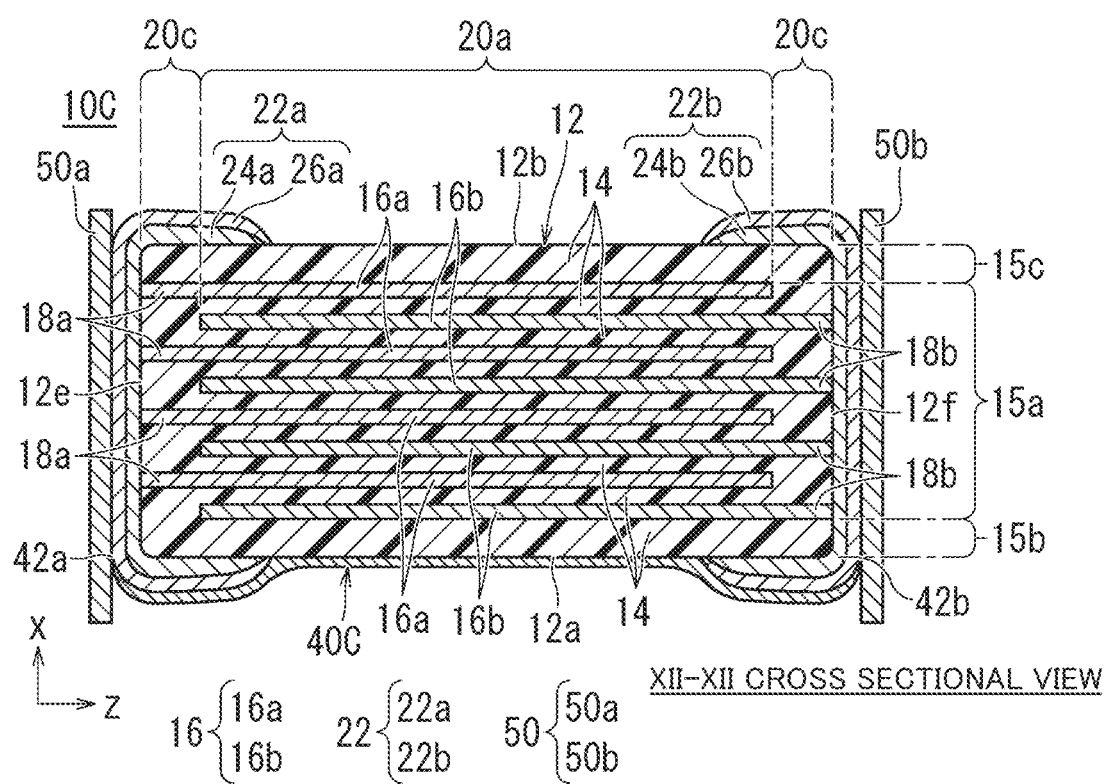
FIG. 12 is a cross sectional view taken along a line XII-XII in FIG. 10.
Figure 13:
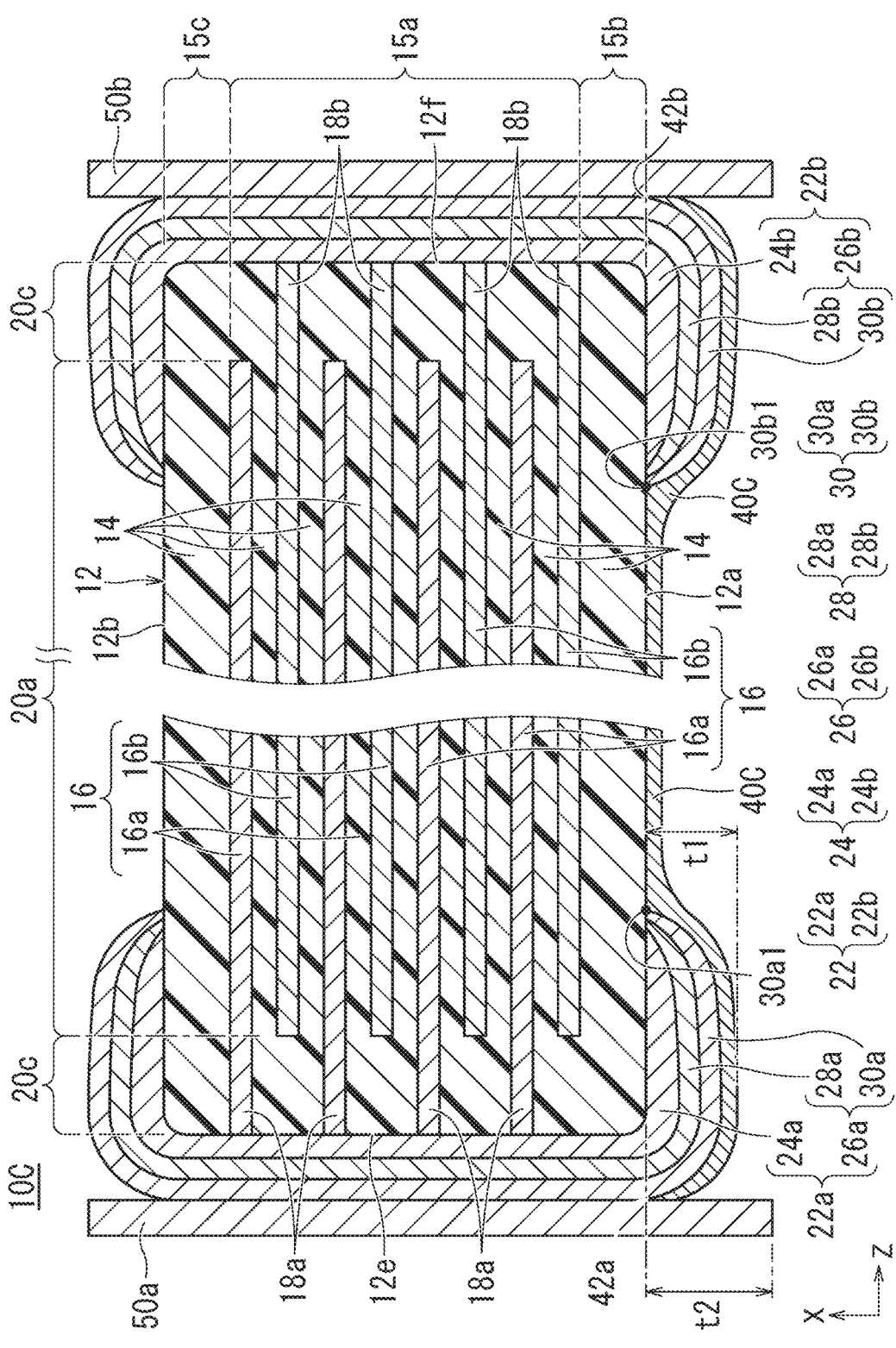
FIG. 13 is an enlarged cross sectional view of outer electrodes in the cross sectional view of the multilayer ceramic capacitor shown in FIG. 12.
Figure 14:
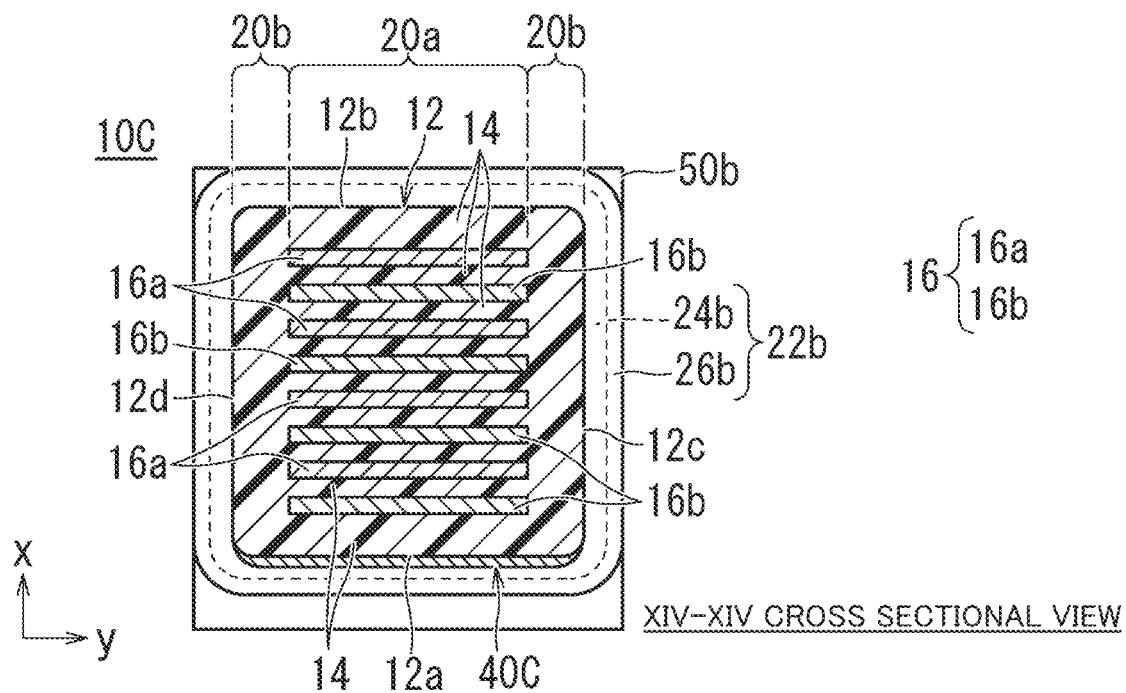
FIG. 14 is a cross sectional view taken along a line XIV-XIV in FIG. 10.

FIG. 10 is an external perspective view showing the multilayer ceramic capacitor as the exemplary multilayer ceramic electronic component according to the second preferred embodiment of the present invention. FIG. 11 is another external perspective view showing the multilayer ceramic capacitor as the exemplary multilayer ceramic electronic component according to the second preferred embodiment of the present invention. FIG. 12 is a cross sectional view taken along a line XII-XII in FIG. 10. FIG. 13 is an enlarged cross sectional view of outer electrodes in the cross sectional view of the multilayer ceramic capacitor shown in FIG. 12. FIG. 14 is a cross sectional view taken along a line XIV-XIV in FIG. 10.

Outer electrodes 22 are provided on the first end surface 12e side and the second end surface 12f side of multilayer body 12. Outer electrodes 22 include a first outer electrode 22a and a second outer electrode 22b.

First outer electrode 22a is provided on the first end surface 12e side of multilayer body 12. First outer electrode 22a covers first end surface 12e of multilayer body 12 and extends from first end surface 12e so as to cover portions of first main surface 12a, second main surface 12b, first side surface 12c, and second side surface 12d. In this case, first outer electrode 22a is electrically connected to first drawn electrode portion 18a of first inner electrode layer 16a.

Second outer electrode 22b is provided on the second end surface 12f side of multilayer body 12. Second outer electrode 22b covers second end surface 12f of multilayer body 12 and extends from second end surface 12f so as to cover portions of first main surface 12a, second main surface 12b, first side surface 12c, and second side surface 12d. In this case, second outer electrode 22b is electrically connected to second drawn electrode portion 18b of second inner electrode layer 16b.

As shown in FIG. 12, each of first outer electrode 22a and second outer electrode 22b includes an underlying electrode layer 24 and a plating layer 26, which are provided in this order from the multilayer body 12 side. It should be noted that each of first outer electrode 22a and second outer electrode 22b in multilayer ceramic capacitor 10C may not include plating layer 26.

Further, each outer electrode 22 includes outermost electrode 50.

Outermost electrodes 50 are disposed on the outermost portions of outer electrodes 22 provided on the first end surface 12e side and the second end surface 12f side of multilayer body 12. Outermost electrodes 50 include a first outermost electrode 50a and a second outermost electrode 50b.

First outermost electrode 50a is disposed on the first end surface 12e side of multilayer body 12. First outermost electrode 50a covers first end surface 12e of multilayer body 12. First outermost electrode 50a preferably has a rectangular or substantially rectangular plate shape. The lower end of first outermost electrode 50a extends downward with respect to the lower end of first end surface 12e of multilayer body 12.

Second outermost electrode 50b is disposed on the second end surface 12f side of multilayer body 12. Second outermost electrode 50b cover second end surface 12f of multilayer body 12. Second outermost electrode 50b preferably has a rectangular or substantially rectangular plate shape. The lower end of second outermost electrode 50b extends downward with respect to the lower end of second end surface 12f of multilayer body 12.

Each outermost electrode 50 includes an intermetallic compound as a main component. The intermetallic compound preferably includes, for example, at least one high melting point metal selected from Cu and Ni, and Sn as a low melting point metal. The intermetallic compound is preferably an intermetallic compound generated by a reaction between Sn and a Cu—Ni alloy. Such an intermetallic compound has the following advantages in the generation of the intermetallic compound: a reaction rate is fast, and a change in shape is small. It should be noted that the intermetallic compound may further include, for example, Ag as a high melting point metal.

Outermost electrode 50 preferably includes a simple Sn metal in addition to the above-described intermetallic compound. The Sn metal of outermost electrode 50 provides excellent solderability when mounting multilayer ceramic capacitor 10C on a mounting substrate or the like. In order to obtain outermost electrode 50 including such a simple Sn metal, an excess of Sn may be included in a metal material to generate the intermetallic compound, for example. A portion of the excess of Sn is not provided for the generation of the intermetallic compound and remains in outermost electrode 50 as the simple Sn metal.

Outermost electrode 50 can be formed by a screen printing method, a dispensing method, or a dipping method, for example.

Insulating layer 40C is provided on an entirety or substantially an entirety of first main surface 12a including first plating layer 26a and second plating layer 26b exposed on the first main surface 12a side of multilayer body 12.

That is, in multilayer ceramic capacitor 10C, insulating layer 40C extends over the surface of first plating layer 26a on the first main surface 12a side of multilayer body 12, the surface of ceramic layer 14 at first main surface 12a between first plating layer 26a and second plating layer 26b, and the surface of second plating layer 26b on the first main surface 12a side of multilayer body 12.

As shown in FIG. 13, insulating layer 40C covers an entirety or substantially an entirety of an end edge portion 30a1 of first upper plating layer 30a located on the first main surface 12a side, and covers an entirety or substantially and entirety of an end edge portion 30b1 of second upper plating layer 30b located on first main surface 12a.

When viewed in width direction y, end portions 42a, 42b of insulating layer 40C in length direction z of multilayer ceramic capacitor 10 are located at outer sides with respect to end surfaces 12e, 12f of multilayer body 12 (i.e., in directions farther away from end surfaces 12e, 12f of multilayer body 12 along length direction z of multilayer body 12) at least in the cross section of the central portion in width direction y.

Since insulating layer 40C is thus provided on the entirety or substantially the entirety of first main surface 12a including first outer electrode 22a and second outer electrode 22b exposed on the first main surface 12a side of multilayer body 12, short circuit due to ion migration between first outer electrode 22a and second outer electrode 22b can be reduced or prevented.

Further, the lower end of first outermost electrode 50a extends downward with respect to the lower end of first end surface 12e of multilayer body 12, thus resulting in a limited contact location between end portion 42a of insulating layer 40C and first outermost electrode 50a. The lower end of second outermost electrode 50b extends downward with respect to the lower end of second end surface 12f of multilayer body 12, thus resulting in a limited contact point between end portion 42b of insulating layer 40C and second outermost electrode 50b.

Insulating layer 40C may be made of a ceramic. When insulating layer 40C is made of a ceramic, at least one selected from $Al_2O_3$, PZT, SiC, $SiO_2$, MgO, and the like, for example, is preferably used. Moreover, when insulating layer 40C is made of a ceramic, mechanical strength of multilayer ceramic capacitor 10C against stress can be further improved. When insulating layer 40C is made of a ceramic, the grain size of the ceramic included in insulating layer 40C is preferably smaller than the grain size of the ceramic included in ceramic layer 14.

When insulating layer 40C is made of a resin, insulating layer 40C may preferably include, for example, one or more of an epoxy resin, a silicone resin, a fluorine resin, a phenol resin, a urea resin, a melamine resin, an unsaturated polyester resin, barium titanate, alumina, silica, yttria, and zirconia. In this case, a thermosetting epoxy resin, which employs the same metal oxide as that used as a solder resist for printed boards, a silicone resin, a fluorine resin, a phenol-based resin, a melamine resin, barium titanate, alumina, silica, or the like is suitably used.

Insulating layer 40C can be provided directly onto first plating layer 26a, second plating layer 26b, and first main surface 12a. The thickness of insulating layer 40C is preferably less than or equal to about 5 μm, for example. When the thickness of insulating layer 40C is less than or equal to about 5 μm, multilayer ceramic capacitor 10C can be stably mounted on a mounting substrate. The thickness of insulating layer 40C is represented by the average value of thicknesses measured under a magnification of 10000x by an SEM at the following three points in the cross section of the central portion in width direction y: the central portions of outer electrodes 22a, 22b in length direction z; and the central portion of multilayer body 12.

Here, t2>t1 is satisfied, where t1 represents a dimension from the surface of first main surface 12a of multilayer body 12 to the first-main-surface-12a-side surface of insulating layer 40C in layering direction x, and t2 represents each of a dimension from the surface of first main surface 12a of multilayer body 12 to the first-main-surface-12a-side surface of the lower end of first outermost electrode 50a (first outer electrode 22a) in layering direction x and a dimension from the surface of first main surface 12a of multilayer body 12 to the first-main-surface-12a-side surface of the lower end of second outermost electrode 50b (second outer electrode 22b) in layering direction x.

Thus, multilayer ceramic capacitor 10 can be stably mounted on a mounting substrate.

Multilayer ceramic capacitor 10C according to the second preferred embodiment shown in FIG. 10 provides not only the same or substantially the same advantageous effects as that of multilayer ceramic capacitor 10 according to the first preferred embodiment but also the following advantageous effects.

That is, according to multilayer ceramic capacitor 10C shown in FIG. 10, insulating layer 40C extends over the surface of first outer electrode 22a on the first main surface 12a side of multilayer body 12, the surface of ceramic layer 14 at first main surface 12a between first outer electrode 22a and second outer electrode 22b, and the surface of second outer electrode 22b on the first main surface 12a side of multilayer body 12. Thus, when mounting multilayer ceramic capacitor 10C on a mounting substrate, the height of a solder fillet is reduced by insulating layer 40C to reduce vibration of multilayer ceramic capacitor 10, so as to reduce acoustic noise. Moreover, mechanical stress in response to stress on multilayer ceramic capacitor 10 caused by deflection of the mounting substrate can be reduced.

Further, according to multilayer ceramic capacitor 10 shown in FIG. 10, outermost electrodes 50 are disposed on the outermost sides with respect to end surfaces 12e, 12f of multilayer body 12, thus resulting in a limited contact location between insulating layer 40C and each outermost electrode 50. Therefore, vibration of multilayer ceramic capacitor 10C is isolated so as to reduce acoustic noise.

Further, in multilayer ceramic capacitor 10C, since outermost electrode 50 can be formed by, for example, the screen printing method, the dispensing method, or the dipping method, high productivity and low production cost can be obtained. Further, when no plating layer 26 is provided in each of first outer electrode 22a and second outer electrode 22b, the plating formation process can be omitted, with the result that higher productivity and lower production cost can be obtained.

2. Method of Manufacturing Multilayer Ceramic Electronic Component

Next, the following describes an exemplary method of manufacturing the multilayer ceramic capacitor as the exemplary multilayer ceramic electronic component.

(1) First, dielectric sheets and a conductive paste for inner electrode are prepared. Each of the dielectric sheets and the conductive paste for inner electrode includes a binder and a solvent. For example, known organic binder and organic solvent may be used.

(2) Next, the conductive paste for inner electrode is printed on each of the dielectric sheets in a predetermined pattern by, for example, screen printing or gravure printing, thus forming an inner electrode pattern.

(3) Further, a predetermined number of dielectric sheets for outer layer on each of which no inner electrode pattern is formed are layered. Then, the dielectric sheets on which the inner electrodes are formed are sequentially layered thereon. Then, a predetermined number of dielectric sheets for outer layer are layered thereon. In this way, a multilayer sheet is produced.

(4) The obtained multilayer sheet is pressed in the layering direction by, for example, hydrostatic pressing or the like. In this way, a multilayer block is produced.

(5) Next, the multilayer block is cut into a predetermined size, thus cutting out a multilayer chip. Corner portions and ridgeline portions of the multilayer chip may be rounded by barrel polishing or the like, for example.

(6) Further, the multilayer chip is calcined to produce multilayer body 12. The calcination temperature is preferably more than or equal to about 900° C. and less than or equal to about 1300° C., for example, although it depends on the materials of the dielectric and the inner electrodes.

(7) A conductive paste for outer electrode is applied onto the end surfaces of multilayer body 12 and is baked, thus forming each of baked layers of the outer electrodes. The baking temperature is preferably more than or equal to about 700° C. and less than or equal to about 900° C., for example.

A plating electrode may be formed directly on the surface of the multilayer body without providing the baked layer. In this case, the following step (7) is performed instead of the foregoing step (7):

(7) Plating is performed on both of the end surfaces of obtained multilayer body 12 to form underlying plating films on exposed portions of the inner electrodes. For the plating, one of electrolytic plating or electroless plating, for example, may be used. However, the electroless plating requires a pretreatment with a catalyst or the like in order to improve a plating deposition rate, thus disadvantageously resulting in a complicated process. Therefore, normally, the electrolytic plating is preferably used. As the plating method, barrel plating, for example, is preferably used.

It should be noted that in the case of forming a surface conductor, a surface conductor pattern may be printed on the outermost ceramic green sheet in advance and may be calcined together with a ceramic body, or the surface conductor may be printed on a main surface of a calcined ceramic body and may be then baked.

(8) Next, an insulating layer providing step of providing insulating layer 40 on the main body of the multilayer ceramic capacitor is performed.

When insulating layer 40 is made of a ceramic, insulating layer 40 is formed by, for example, an aerosol deposition method (AD method). Specifically, insulating layer 40 is formed in the following manner. A carrier gas and a raw material of the insulating film are mixed in an aerosol generator. The mixture is sent from the aerosol generator to a pipe as an aerosol, and is guided toward a nozzle provided at the tip thereof. The aerosol is thermally sprayed from the nozzle toward the first main surface side of the main body of the multilayer ceramic capacitor. As a result, fine particles of the raw material of insulating layer 40 hit against the first main surface side of the main body of the multilayer ceramic capacitor and are accordingly pulverized to form insulating layer 40. It should be noted that as the method of forming insulating layer 40, a thermal spraying method such as a cold spraying method, a CVD (chemical vapor deposition) method, or the like, for example, may be used instead of the AD method.

When the insulating layer is made of a resin, the insulating film can be formed by using a spraying apparatus, a dipping apparatus, or the like, for example. Alternatively, the insulating layer may be formed by pasting, or may be formed by the screen printing method, for example.

Then, insulating layer 40 is fixedly adhered to the multilayer ceramic capacitor by, for example, thermal curing or drying depending on physical properties of the insulating material.

(9) Further, as required, plating is provided on the surfaces of the baked layers of the conductive paste for outer electrode.

(10) Then, as required, plating layers are formed on the surfaces of the plating electrodes for outer electrode.

In this way, multilayer ceramic capacitor 10 is manufactured.

3. Multilayer Ceramic Electronic Component Mounted Structure

Figure 15:
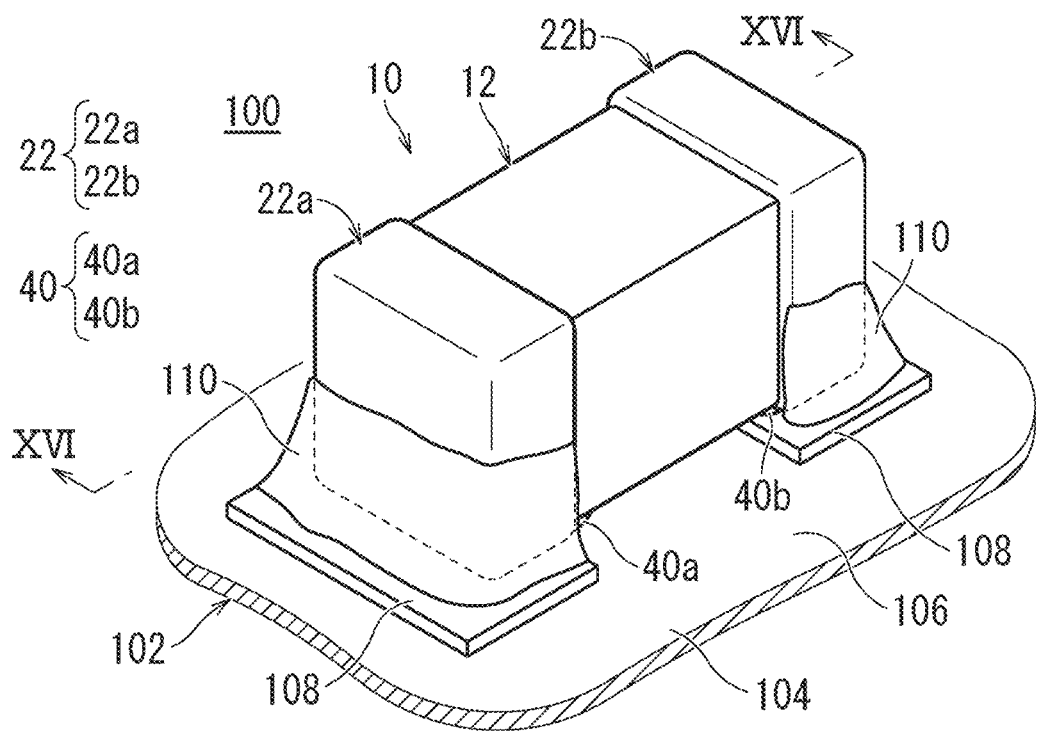
FIG. 15 is a perspective view showing a major portion of an exemplary multilayer ceramic capacitor mounted structure in which the multilayer ceramic capacitor as the exemplary multilayer ceramic electronic component according to the first preferred embodiment of the present invention is mounted.
Figure 16:
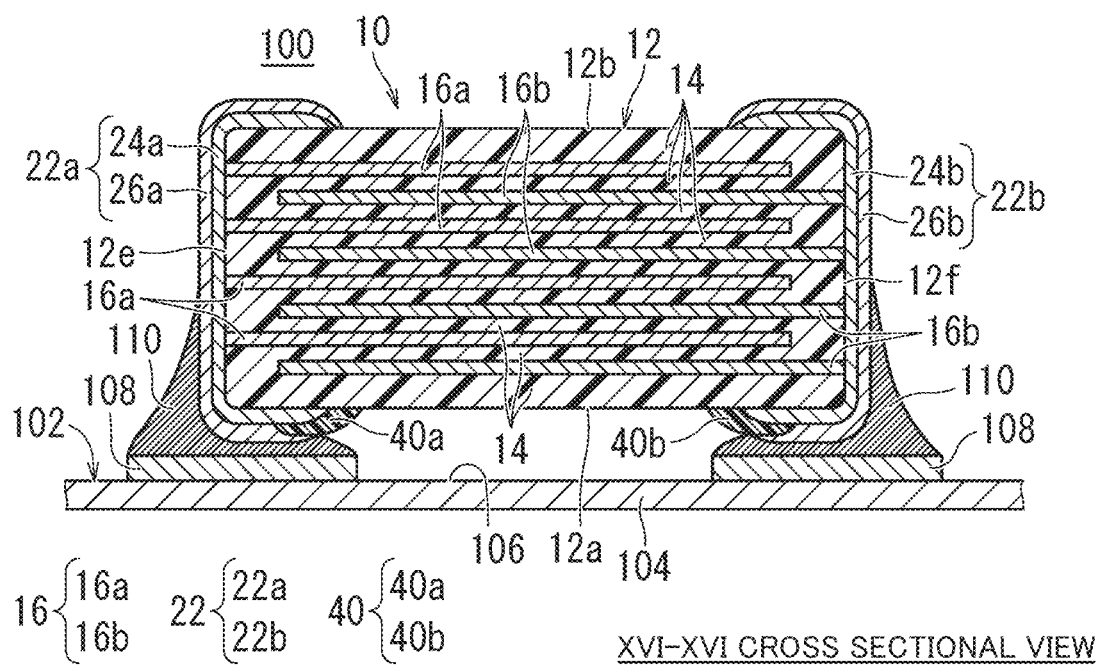
FIG. 16 is a cross sectional view taken along a line XVI-XVI and showing the multilayer ceramic capacitor mounted structure shown in FIG. 15.

Next, the following fully describes a multilayer ceramic capacitor mounted structure 100 in which the multilayer ceramic capacitor as the exemplary multilayer ceramic electronic component is mounted, particularly with reference to FIGS. 15 and 16, for example. FIG. 15 is a perspective view showing a major portion of an exemplary multilayer ceramic capacitor mounted structure in which the multilayer ceramic capacitor as the exemplary multilayer ceramic electronic component according to the first preferred embodiment of the present invention is mounted. FIG. 16 is a cross sectional view taken along a line XVI-XVI and showing the multilayer ceramic capacitor mounted structure shown in FIG. 15.

Multilayer ceramic capacitor mounted structure 100 includes multilayer ceramic capacitor 10 and a mounting substrate 102 as shown in FIGS. 15 and 16, for example. Mounting substrate 102 includes a substrate main body 104. Substrate main body 104 is preferably made of, for example, a resin such as glass epoxy or a ceramic such as glass ceramic. Substrate main body 104 may include, for example, a plurality of layered insulator layers. A mounting surface 106 is provided on one main surface of substrate main body 104. Land electrodes 108 each having, for example, a rectangular or substantially rectangular shape when viewed in a plan view are disposed on mounting surface 106. Multilayer ceramic capacitor 10 is mounted thereon by fixedly connecting first outer electrode 22a and second outer electrode 22b of multilayer ceramic capacitor 10 to land electrodes 108 by solders 110, for example. In this case, first outer electrode 22a and second outer electrode 22b located on the first main surface 12a side of multilayer body 12 are mounted on land electrodes 108.

In multilayer ceramic capacitor mounted structure 100 shown in FIG. 15, first insulating layer 40a extends continuously from the surface of ceramic layer 14 at first main surface 12a of multilayer body 12 to the surface of first underlying electrode layer 24a located on the first main surface 12a side, and second insulating layer 40b extends continuously from the surface of ceramic layer 14 at first main surface 12a of multilayer body 12 to the surface of second underlying electrode layer 24b located on the first main surface 12a side. Thus, when multilayer ceramic capacitor 10 is mounted on the mounting substrate, mechanical strength against stress on multilayer ceramic capacitor 10 can be improved because the portions of multilayer ceramic capacitor 10 on which stress is concentrated are covered with insulating layers 40a, 40b and insulating layers 40a, 40b are not wetted by solders 110.

Further, in multilayer ceramic capacitor mounted structure 100 shown in FIG. 15, t2>t1 is satisfied, where t1 represents each of the dimension from the surface of first main surface 12a of multilayer body 12 to the first-main-surface-12a-side surface of first insulating layer 40a in layering direction x and the dimension from the surface of first main surface 12a of multilayer body 12 to the first-main-surface-12a-side surface of second insulating layer 40b in layering direction x, and t2 represents each of the dimension from the surface of first main surface 12a of multilayer body 12 to the first-main-surface-12a-side surface of first plating layer 26a (first outer electrode 22a) in layering direction x and the dimension from the surface of first main surface 12a of multilayer body 12 to the first-main-surface-12a-side surface of second plating layer 26b (second outer electrode 22b) in layering direction x. Thus, when mounting multilayer ceramic capacitor 10 on a mounting substrate, outer electrodes 22 are brought into contact with solders 110 disposed on upper surfaces of land electrodes 108 disposed on the mounting substrate prior to insulating layers 40a, 40b, such that multilayer ceramic capacitor 10 can be stably mounted on mounting substrate 102. Thus, a problem such as, for example, a tombstone phenomenon can be reduced or prevented.

It should be noted that although the preferred embodiments of the present invention have been disclosed in the above description, the present invention is not limited thereto.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic electronic component comprising:
    a multilayer body including a plurality of layered ceramic layers and a plurality of layered inner electrode layers, a first main surface and a second main surface facing each other in a layering direction, a first side surface and a second side surface facing each other in a width direction orthogonal or substantially orthogonal to the layering direction, and a first end surface and a second end surface facing each other in a length direction orthogonal or substantially orthogonal to the layering direction and the width direction;
    a first outer electrode covering the first end surface and extending from the first end surface so as to cover portions of the first main surface, the second main surface, the first side surface, and the second side surface;

a second outer electrode covering the second end surface and extending from the second end surface so as to cover portions of the first main surface, the second main surface, the first side surface, and the second side surface; and an insulating layer continuously extending from a ceramic layer at the first main surface of the multilayer body so as to cover an end edge portion of the first outer electrode located on the first main surface of the multilayer body, and continuously extending from the ceramic layer at the first main surface of the multilayer body so as to cover an end edge portion of the second outer electrode located on the first main surface of the multilayer body; wherein $t2>t1$ is satisfied, where $t1$ represents a dimension from a surface of the first main surface of the multilayer body to a first-main-surface-side surface of the insulating layer in the layering direction, and $t2$ represents each of a dimension from the surface of the first main surface of the multilayer body to a first-main-surface-side surface of the first outer electrode in the layering direction and a dimension from the surface of the first main surface of the multilayer body to a first-main-surface-side surface of the second outer electrode in the layering direction;

at least one of end edge portions of the first and second outer electrodes on the second main surface and end edge portions of the first and second outer electrodes on each of the first and second side surfaces is not covered by the insulating layer;

the insulating layer is provided only on the first main surface side of the multilayer body;

the first outer electrode includes a first underlying electrode layer and a first plating layer disposed on a surface of the first underlying electrode layer, and the second outer electrode includes a second underlying electrode layer and a second plating layer disposed on a surface of the second underlying electrode layer;

the insulating layer covers end portions of the first underlying electrode layer and the second underlying electrode layer, and the first and second plating layers cover end portions of the insulating layer; and end edges of the insulating layer reach an outer end of a facing electrode portion of the plurality of layered inner electrode layers in the length direction, the facing electrode portion being a portion in which all of the plurality of layered inner electrode layers face each other in the layering direction.

2. The multilayer ceramic electronic component according to claim 1, wherein
the insulating layer continuously extends from the ceramic layer at the first main surface of the multilayer body so as to cover an end edge portion of the first underlying electrode layer located on the first main surface side of the multilayer body, and continuously extends from the ceramic layer at the first main surface of the multilayer body so as to cover an end edge portion of the second underlying electrode layer located on the first main surface side of the multilayer body.

3. The multilayer ceramic electronic component according to claim 1, wherein
each of the first plating layer and the second plating layer includes a plurality of plating layers; and
the insulating layer continuously extends from the ceramic layer at the first main surface of the multilayer body so as to cover an end edge portion of one plating layer of the plurality of plating layers of the first plating layer, and continuously extends from the ceramic layer at the first main surface of the multilayer body so as to cover an end edge portion of one plating layer of the plurality of plating layers of the second plating layer, the one plating layer of the plurality of plating layers of the first plating layer being located on the first main surface side of the multilayer body, the one plating layer of the plurality of plating layers of the second plating layer being located on the first main surface side of the multilayer body.

4. The multilayer ceramic electronic component according to claim 1, wherein
the inner electrode layers include a first inner electrode layer and a second inner electrode layer, the first inner electrode layer extending to the first end surface side and electrically connected to the first outer electrode, the second inner electrode layer extending to the second end surface side and electrically connected to the second outer electrode; and
the insulating layer includes end edges located on outer sides with respect to a facing electrode portion in the length direction and located on the first end surface side and the second end surface side of the insulating layer, the facing electrode portion being a portion in which the first inner electrode layer and the second inner electrode layer face each other.

5. The multilayer ceramic electronic component according to claim 1, wherein the insulating layer is made of a ceramic.

6. The multilayer ceramic electronic component according to claim 5, wherein the ceramic includes at least one of $Al_2O_3$, PZT, SiC, $SiO_2$, or MgO.

7. The multilayer ceramic electronic component according to claim 1, wherein the insulating layer is made of a resin.

8. The multilayer ceramic electronic component according to claim 1, wherein
the insulating layer covers an entirety or substantially and entirety of the first main surface side of the multilayer ceramic electronic component;
the first outer electrode includes a first outermost electrode on the first end surface side of the multilayer body, and the second outer electrode includes a second outermost electrode on the second end surface side of the multilayer body; and
each of the first outermost electrode and the second outermost electrode includes an intermetallic compound as a main component, the intermetallic compound including at least one high melting point metal selected from Cu and Ni, and Sn as a low melting point metal.

9. The multilayer ceramic electronic component according to claim 8, wherein the intermetallic compound includes a material provided by a reaction between Sn and a Cu—Ni alloy.

10. The multilayer ceramic electronic component according to claim 1, wherein the multilayer body includes rounded corners and rounded ridgeline portions.

11. The multilayer ceramic electronic component according to claim 1, wherein each of the plurality of ceramic layers includes at least one of $BaTiO_3$, $CaTiO_3$, $SrTiO_3$, Pb, Fe ferrite beads, or $CaZrO_3$ as a main component.

12. The multilayer ceramic electronic component according to claim 11, wherein each of the plurality of ceramic layers further includes at least one of a Mn compound, a Fe compound, a Cr compound, a Co compound or a Ni compound as a sub-component.

13. The multilayer ceramic electronic component according to claim 1, wherein each of the plurality of ceramic layers has a thickness that is more than or equal to about 0.3 μm and less than or equal to about 5.0 μm.

14. The multilayer ceramic electronic component according to claim 1, wherein a dimension of the multilayer body in the layering direction is more than or equal to about 100 μm and less than or equal to about 4 mm, a dimension of the multilayer body in the length direction is more than or equal to about 100 μm and less than or equal to about 3 mm, and a dimension of the multilayer body in the width direction is more than or equal to about 100 μm and less than or equal to about 3 mm.

15. The multilayer ceramic electronic component according to claim 1, wherein each of the plurality of inner electrode layers has a thickness of more than or equal to about 0.1 μm and less than or equal to about 3.0 μm.

16. The multilayer ceramic electronic component according to claim 1, wherein each of the plurality of inner electrode layers includes at least one of Ni, Cu, or Ag.

17. The multilayer ceramic electronic component according to claim 1, wherein each of the first and second outer electrodes includes a plating layer as an outermost layer.

18. The multilayer ceramic electronic component according to claim 17, wherein the plating layer includes at least one of Cu, Ni, Sn, Ag, Pd, an Ag—Pd alloy, or Au.

19. The multilayer ceramic electronic component according to claim 17, wherein the plating layer includes a plurality of layers.

20. The multilayer ceramic electronic component according to claim 17, wherein the plating layer includes a Ni plating layer and a Sn plating layer covering the Ni plating layer.

21. The multilayer ceramic electronic component according to claim 1, wherein a thickness of the insulating layer is less than or equal to about 5 μm.

22. The multilayer ceramic electronic component according to claim 1, wherein
the insulating layer includes a first insulating layer and a second insulating layer; and
the first insulating layer covers the first outer electrode and the second insulating layer covers the second outer electrode.

\* \* \* \* \*